United States Patent
Kim et al.

(10) Patent No.: US 6,905,205 B2
(45) Date of Patent: Jun. 14, 2005

(54) LENS FIXING APPARATUS FOR RIMLESS SPECTACLE

(75) Inventors: Hyoung Sik Kim, Samik Apt. A-506, 51 Yeoeuido-dong, Youngdeungpo-ku, Seoul 150-010 (KR); Bong Joo Cho, Seoul (KR)

(73) Assignee: Hyoung Sik Kim, Seoul (KR)

( * ) Notice: Subject to any disclaimer, the term of this patent is extended or adjusted under 35 U.S.C. 154(b) by 0 days.

(21) Appl. No.: 10/485,732
(22) PCT Filed: Aug. 7, 2002
(86) PCT No.: PCT/KR02/01500
§ 371 (c)(1), (2), (4) Date: Feb. 4, 2004
(87) PCT Pub. No.: WO03/014805
PCT Pub. Date: Feb. 20, 2003

(65) Prior Publication Data
US 2004/0233381 A1 Nov. 25, 2004

(30) Foreign Application Priority Data

| Aug. 7, 2001 | (KR) | 2001/23971 U |
| Jul. 18, 2002 | (KR) | 2002/41977 |
| Aug. 5, 2002 | (KR) | 2002/23404 U |

(51) Int. Cl.[7] .................................................. G02C 1/02
(52) U.S. Cl. ........................................ 351/110; 351/146
(58) Field of Search ........................ 351/110, 140–149, 351/64–70

(56) References Cited

U.S. PATENT DOCUMENTS

| 1,966,009 A | * | 7/1934 | Gagnon ........................ 351/148 |
| 2,267,051 A | * | 12/1941 | Stevens ........................ 351/141 |
| 5,412,440 A | * | 5/1995 | Takeda et al. .............. 351/110 |

* cited by examiner

Primary Examiner—Huy Mai
(74) Attorney, Agent, or Firm—Rosenberg, Klein & Lee

(57) ABSTRACT

A lens fixing apparatus for rimless spectacles includes a holder combined to the temple of the rimless spectacles or one side of the bridge. Both surfaces of the lens are compressively fixed along the inner circumference thereof, and a fixing frame has a compression surface. The rear surface of the lens contacts the front surface of the fixing frame and the rear surface of the fixing frame has a slanted surface formed thereon, the thickness thereof gradually increasing as it extends outwardly. The fixing frame has an elongated hole of a predetermined length formed through the surface opposing the lens, longitudinally along the compression surface.

9 Claims, 33 Drawing Sheets

1051A

1051B

LENS FIXING APPARATUS FOR RIMLESS SPECTACLE

TECHNICAL FIELD

The present invention relates to a lens fixing apparatus for rimless spectacles, and more particularly, to a lens fixing apparatus for the rimless spectacles in which a range of an allowable error with respect to a perforation position of each through-hole can be widely accommodated when an expert in eyeglasses perforates the through-hole of each lens manually in order to connect the lens to a fixing frame without leaving any gap between the side end of the lens and a holder, and thus the lens is compressively fixed to the fixing frame and the inner sides of the holder respectively without leaving any gap therebetween to thereby eradicate a twisting phenomenon of the lens, and simultaneously a fixing bolt and a fixing nut connected to both the lens and the fixing frame are prevented from being loosened, with a result that a reliability of the spectacles can be secured and work time for manufacturing the spectacles are reduced to thereby increase a productivity.

BACKGROUND ART

In general, rimless spectacles fix lenses through lens fixing apparatuses respectively fixed to a bridge and temples of the spectacles at the state where a fixing rim surrounding each lens has been removed. While using the rimless spectacles, a shape of the lens can be freely fabricated to fit into the shape of a wearer's face. Also, since only lenses without having any rims surrounding the lenses are used and put on, the rimless spectacles are very light. Further, since a wearer's face is not so much hidden by the rimless spectacles, a demand on the rimless spectacles is increasing nowadays.

As shown in FIG. 1, in the case of a lens fixing apparatus 10 in such a conventional rimless spectacles, one end of a bending portion 5 to which one side of a temple of the rimless spectacles is hinge-coupled, is weld-combined with one of holders for fixing both ends of a lens 1, and one end of a bridge 9 is weld-combined with the other of holders. Likewise, one end of a bending portion of the other temple of the rimless spectacles and the other end of the bridge 9 are weld-combined with holders for fixing both ends of the other lens.

In this case, a combining hole 15 having a diameter D1 corresponding to that of a fixing bolt 17 is formed on each fixing frame 13 in the lens fixing apparatus 10. Likewise, a through-hole 3 having a diameter D2 corresponding to that of the fixing bolt 17 is formed on each side of the lens 1.

In this manner, the lends 1 is fixed to the fixing frame 13 by the fixing bolt 17 which pierces the through-hole 3 of the lens 1 and the combining hole 15 of the fixing frame 13 in turn and a nut 19 combined with the fixing bolt 17.

By the way, the pair of the above-described conventional rimless spectacles has required a procedure of establishing perforating positions of the through-holes 3 accurately and perforating the through-holes 3, so that a distance L2 between the center of the through-hole 3 and the side end of the lens 1 can be maintained in correspondence to a distance L1 between the center of the combining hole 15 of the fixing frame 13 and the inner side of a holder 11, in order to make the side surface of the lens 1 compressively contact the inner side of the holder 11 when the lens 1 is made fixed to the fixing frame 13, differently from a pair of common eyeglasses where an assembly of lenses can be done quickly by loosening fixing bolts combined with only a glasses frame and then fitting the lenses into the glasses frame, after the correction lenses have been processed to fit into the eyesight of a glasses wearer.

Thus, an eyeglasses expert should set a position to be perforated in order to perforate the through-hole 3 via the combining hole 15 using an auger, at the state where the lens 1 has been put in front of the lens fixing frame 13, and then drilled manually to thereby form the through-hole 3.

By the way, since the eyeglasses expert should perforate the through-hole 3 on the lens manually, it is very difficult to maintain the lengths of "L1" and "L2" to equal each other as shown in FIG. 1. If a distance between the center of the through-hole 3 and the side end of the lens is set larger than "L2," the side end of the lens 1 does not compressively contact the inner side of the holder 11. As a result, it is not possible to fix the lens 1 to the fixing frame 13.

Also, in the case that a distance between the center of the through-hole 3 and the side end of the lens is set smaller than "L2," the side end of the lens 1 does not completely closely contact the inner side of the holder 11, and a gap is formed between the side end of the lens 1 and the inner side of the holder. In this state, in the case that the fixing bolt 17 and the nut 19 are combined with the lens 1 and the fixing frame 13, a combining force F to be formed by the fixing bolt 17 and the nut 19 is generated by a combining force Fy only in the axial direction of the fixing bolt 17. Accordingly, the rear surface of the lens 1 is compressively fixed to the front surface of the fixing frame 13.

Thus, when a wearer is wearing the rimless spectacles, the lens 1 is twisted around the fixing bolt 17 in the case that a vibration and a shock is transferred to the rimless spectacles. If such a phenomenon is repeated, the fixing bolt 17 and the nut 19 are gradually loosened.

As a result, the wearer is apt to feel eye strain easily since his or her eye's focus does not match that of the lens due to the twisted lens 1, and his or her eyesight is deteriorated as well.

Meanwhile, as described above in the conventional case, the through-hole 3 of the lens 1 cannot but be perforated equally at a position where the side surface of the lens is compressively attached to the holder 11. Accordingly, a curvature, a degree and a thickness of the lens which are applied differently according to the degree of the eyesight of the wearer, have not been considered.

As a result, in the case that a lens is a thicker concave lens which becomes thicker as it goes to the outer wall of the lens, the fixing bolt 17 combined with the through-hole 3 of the lens obstructs a wearer's field of vision. In the case that a lens is a thinner convex lens which becomes thinner as it goes to the outer wall of the lens, portions which support the fixing bolt 17 are thin. Accordingly, since the thin portions of the lens do not bear up the combining force of the fixing bolt and the nut, the lens is broken.

Also, the glasses experts who assemble the rimless spectacles should concentrate on work for a long time in order to accurately work a small-sized through-hole 3 on the lens to fit into a position of the combining hole 15 as described above, quickly at the state where many customers stand by. Accordingly, a degree of fatigue from work increases and an assembly productivity decreases. If the through-hole 3 of the lens has not been accurately perforated at a set position, the lens 1 is not used and then is discarded.

DISCLOSURE OF THE INVENTION

To solve the above problems, it is an object of the present invention to provide a lens fixing apparatus for rimless spectacles in which a long hole is formed on each of fixing frames and an oblique plane is formed in the rear surface of each of the fixing frames so that a range of an allowable error with respect to a perforation position of each through-hole can be widely accommodated when an expert in glasses perforates the through-hole of each lens manually in order to connect the lens to each of the fixing frames without leaving any gap between the side ends and a holder of the lens, and thus the lens is compressively fixed to the fixing frames and the inner sides of the holder respectively without leaving any gap therebetween to thereby eradicate a twisting phenomenon of the lens, and simultaneously a fixing bolt and a fixing nut connected to both the lens and each of the fixing frames are prevented from being loosened, with a result that a reliability of the spectacles can be secured and working hours for manufacturing the spectacles are shortened to thereby enhance a productivity.

It is another object of the present invention to provide a lens fixing apparatus for rimless spectacles, in which a fixing bolt is penetrated into and combined with a fixing frame and a lens, in a slanted state slanted with respect to the lens, and a combining force having occurred by connection of a nut to the fixing bolt is dispersed into a horizontal combining force with respect to the front surface of the lens and a vertical combining force respectively, and a stress concentration is mitigated on a particular portion of the inner side of a through-hole of the lens, to thereby prevent the lens from being broken.

It is still another object of the present invention to provide a lens fixing apparatus for rimless spectacles, in which a fixing frame and a sawtooth-shaped washer form a one-direction sawtooth-shaped unevenness portion on a mutually opposed surface, respectively, and a fixing bolt is connected at the state where a lens has been pressed in a holder direction, and simultaneously a twisting preventive unit is disposed between the side surface of the lens and the holder, with a result that one side of the lens is stuck to the holder side without any gap between the lens and the holder, and thus the lens is prevented from being pushed backwards or twisted, due to a vibration or shock applied to the rimless spectacles during wearing, and further the lens is fixed to the fixing frame with a strong combining force, to thereby prevent the fixing bolt and the nut from being loosed.

It is yet another object of the present invention to provide a lens fixing apparatus for rimless spectacles having a wedge-shaped washer for preventing a gap between the side surface and a holder from being formed due to a lens pushed by a shock or vibration when the lens is fixed to a fixing frame through coupling units, in which the fixing frame and the washer is wedge-combined with each other.

It is still yet another object of the present invention to provide a lens fixing apparatus for rimless spectacles, in which an eyesight is deteriorated owing to variation of the focuses of an eye and a lens because the lens is strongly fixed to the fixing frame, and thus working hours for manufacturing the spectacles are shortened to thereby enhance a productivity.

To accomplish the above object of the present invention, according to a first aspect of the present invention, there is provided a lens fixing apparatus for rimless spectacles in which each lens is fixed to each temple of the spectacles or a bridge, without having any rims, the lens fixing apparatus comprising: a holder combined to the temple of the rimless spectacles or one side of the bridge, in which both surfaces of the lens are compressively fixed along the inner circumference; and a fixing frame having a compression surface which is extensively formed perpendicularly in the middle portion of the holder, in which the rear surface of the lens contacts the front surface of the fixing frame, a slanted surface formed in the rear surface of the holder, whose thickness is gradually increased as it becomes farther from the holder, and a long hole of a predetermined length formed on the surface opposing the lens, along the lengthy direction of the compression surface, wherein a first distance between a through-hole of the lens and the outer circumferential portion of the lens is established within a range where the first distance is longer or equal to a second distance from the holder to the starting portion of the long hole and shorter or equal to a third distance from the holder to the ending portion of the long hole.

It is possible to form the slanted surface of the fixing frame into one of a curved surface and a flat surface.

In this case, the lens fixing apparatus according to the first aspect further comprises a wedge having a through-hole through which a fixing bolt penetrates on the center thereof so that the wedge can be inserted between the bottom of a nut and the slanted surface of the fixing frame, in which a corresponding surface is formed on one surface of the wedge in correspondence to the slanted surface and simultaneously the other surface of the wedge having an uneven portion is formed in parallel with the inner circumferential portion of the fixing frame.

Also, in the lens fixing apparatus according to the first aspect, the lens slidingly moves along the long hole until the side surface of the lens is closely fixed to the holder as the lens is combined with the fixing frame with the fixing bolt and the nut.

According to another aspect of the present invention, there is also provided a lens fixing apparatus of rimless spectacles in which each lens is fixed to each temple of the spectacles or a bridge, without having any rims, the lens fixing apparatus comprising: a fixing frame having a compression surface compressively contacting the rear surface of the lens, formed on the front surface of the fixing frame, in which a holder on one side of the front surface of which the side surface of the lens compressively contacts is formed perpendicularly to the compression surface, a first sawtooth-shaped uneven portion is formed on the rear surface of the fixing frame, made of a plurality of protrusions each whose one surface is vertical and other surface is slanted and a long hole is formed on the center of the fixing frame; a sawtooth-shaped washer having a second sawtooth-shaped uneven portion made of a plurality of protrusions whose one surface is vertical and other surface is slanted, so as to be engaged with the first sawtooth-shaped uneven portion; a fixing bolt penetrating the lens, the long hole of the fixing frame and the sawtooth-shaped washer, respectively; and a nut combined with the fixing bolt.

According to still another aspect of the present invention, there is also provided a lens fixing apparatus of rimless spectacles in which each lens is fixed to each temple of the spectacles or a bridge, without having any rims, the lens fixing apparatus comprising: a fixing frame having a first sawtooth-shaped uneven portion formed on the rear surface of the fixing frame, made of a plurality of protrusions whose one surface is vertical and other surface is slanted, in which a holder to which the side surface of the lens compressively contacts on one side of the fixing frame, is formed perpendicularly to the rear surface of the fixing frame, and a long hole is formed on the center of the fixing frame; a supporter on one side of which the a compression surface is formed so that the side surface of the lens compressively contacts, and on the other side of which a second sawtooth-shaped uneven portion is formed, made of a plurality of protrusions each whose one surface is vertical and other surface is slanted, so as to be engaged with the first sawtooth-shaped uneven portion of the fixing frame; a sleeve washer extensively formed from the close contact surface of the supporter, having an extension inserted into a through-hole of the lens; a fixing bolt penetrating the long hole of the fixing frame; the sleeve washer and the through-hole of the lens, in turn; and a nut combined with the fixing bolt.

According to yet another aspect of the present invention, there is also provided a lens fixing apparatus of rimless spectacles in which each lens is fixed to each temple of the spectacles or a bridge, without having any rims, the lens fixing apparatus comprising: a fixing frame having a first sawtooth-shaped uneven portion, inwardly made of a plurality of protrusions whose one surface is vertical and other surface is slanted, in which a through-hole penetrating the first sawtooth-shape uneven portion is formed; a moving supporter disposed between the lens and the fixing frame, having a second sawtooth-shaped uneven portion on one surface of which are formed of a plurality of protrusions each whose one surface is vertical and other surface is slanted, so as to be engaged with the first sawtooth-shaped uneven portion, and on the other surface of which is formed of a compression surface which the front surface of the lens compressively contacts, in which a holder is formed on one side of and perpendicularly to the compression surface and a long hole is formed on the center of the compression surface; a fixing bolt penetrating the through-hole of the fixing frame, a long hole of the moving supporter, and the through-hole of the lens, in turn; and a nut combined with the fixing bolt.

Also, according to yet still another aspect of the present invention, there is also provided a lens fixing apparatus of rimless spectacles in which each lens is fixed to each temple of the spectacles or a bridge, without having any rims, the lens fixing apparatus comprising: a fixing frame having a compression surface compressively contacting the rear surface of the lens, formed on the front surface of the fixing frame, in which a holder on one side of the front surface of which the side surface of the lens compressively contacts is formed perpendicularly to the compression surface, a groove having a predetermined angle is formed on the rear surface of the fixing frame and a long hole is formed on the center of the fixing frame; a wedge-shaped washer having a slanted protrusion portion wedge-combined with the groove on one side thereof; a fixing bolt penetrating the lens, the long hole of the fixing frame and the wedge-shaped washer, respectively; and a nut combined with the fixing bolt.

In the present invention according to the above-described features, any one of the first sawtooth-shaped uneven portion or the second sawtooth-shaped uneven portion whose vertical surface is slanted at a predetermined angle, so that the side surface of the lens closely contacts the holder inwards.

In this case, the present invention further comprises at least one fixing unit for preventing the lens from being twisted in which one side of the fixing unit is fixed to the holder and the other side of the fixing unit is compressed or inserted into the side surface of the lens.

Here, the fixing unit is formed in the form of an unevenness inwards from the holder.

Also, the present invention further comprises a cushion member formed between the fixing unit formed integrally inwards from the holder and the lens, and coated with an adhesive on both surfaces in order to fix the lens and the fixing unit mutually.

Meanwhile, according to a further aspect of the present invention, there is also provided a lens fixing apparatus of rimless spectacles in which each lens is fixed to each temple of the spectacles or a bridge, without having any rims, the lens fixing apparatus comprising: a fixing frame having a compression surface extensively formed in one side of the temple of the spectacles or the bridge, in which a portion of the front surface of the lens compressively contacts the rear surface of the fixing frame, a first through-hole is formed to obliquely penetrate the rear and front surfaces of the compression surface, and a holder for fixedly supporting one side of the lens is extensively formed perpendicularly to the compression surface; a second through-hole formed in a slanted way in one side of the lens; a fixing bolt including a head supported to the first through-hole, and a screw portion extended from the lower end of the head and obliquely inserted into the first and second through-holes; and a nut threadedly combined with the other end of the fixing bolt, wherein in the case that the nut is combined on the screw portion, a combining force applied along the axial direction of the fixing bolt obliquely combined to the fixing frame and the lens is dispersed into a vertical combining force directed from the front surface of the lens to the compression surface and a horizontal combining force directed to from the one side of the lens to the holder, respectively.

The lens fixing apparatus according to the further aspect of the present invention further comprises a slanted washer disposed between the nut and the rear surface of the lens, whose one surface is slanted in correspondence to a curvature of the lens.

Also, in the lens fixing apparatus according to the further aspect of the present invention, the first through-hole of the fixing frame comprises a stepped surface in the inside of the first through-hole. In the fixing bolt, the head is pivotally securely disposed in the stepped surface of the first through-hole, and the screw portion is extensively formed from the head and penetrates the first through-hole of the fixing frame and the second through-hole of the lens.

In addition, in the lens fixing apparatus according to the further aspect of the present invention, the fixing frame further comprises a close adhesion surface having a slope in correspondence to that of the fixing bolt on the front side of the fixing frame so that the lower end of the head of the fixing bolt obliquely combined to the fixing frame closely contacts the fixing frame.

In this case, the head forms a bend in its lower end, and the stepped surface of the first through-hole forms a bend in correspondence to the lower end of the head.

Also, the head has a flat lower end in order to fixedly maintain a combining angle of the fixing bolt combined to the fixing frame, and the stepped surface of the first through-hole is formed flatly and obliquely in correspondence to the head.

Meanwhile, according to a still further aspect of the present invention, there is also provided a lens fixing apparatus of rimless spectacles in which each lens is fixed to each temple of the spectacles or a bridge, without having any rims, the lens fixing apparatus comprising: a fixing frame having a compression surface extensively formed in one side of the temple of the spectacles or the bridge, in which a portion of the front surface of the lens compressively contacts the rear surface of the fixing frame, a first through-hole is formed on the compression surface and a holder is extensively formed perpendicularly to the compression surface; a fixing bolt formed of a circular head pivotally supported to the first through-hole of the fixing frame and a screw portion extended from the head and obliquely and penetratively combining the fixing frame and lens horizontally with each other; a nut threadedly combined with the other end of the fixing bolt; a slanted washer whose one surface is slanted, which is disposed between the nut and the rear surface of the lens; and a second through-hole obliquely formed in one side of the lens, through which the screw portion is penetrated, wherein in the case that the nut is combined on the screw portion, a combining force applied along the axial direction of the fixing bolt obliquely combined to the fixing frame and the lens is dispersed into a vertical combining force directed from the front surface of the lens to the compression surface and a horizontal combining force directed to from the one side of the lens to the holder, respectively.

Also, according to a yet further aspect of the present invention, there is also provided a lens fixing apparatus of rimless spectacles in which each lens is fixed to each temple of the spectacles or a bridge, without having any rims, the lens fixing apparatus comprising: a fixing frame having a compression surface extensively formed in one side of the temple of the spectacles or the bridge, in which a portion of the front surface of the lens compressively contacts the rear surface of the fixing frame, a first through-hole is formed to penetrate the rear and front surfaces of the fixing frame and a holder is extensively formed perpendicularly to the compression surface; a fixing bolt formed of a circular head pivotally and hingedly combined to the first through-hole of the fixing frame and a screw portion extended from the head and obliquely and penetratively combining the fixing frame and lens horizontally with each other; a nut threadedly combined with the other end of the fixing bolt; a slanted washer whose one surface is slanted, which is disposed between the nut and the rear surface of the lens; and a second through-hole obliquely formed in one side of the lens, through which the screw portion is penetrated, wherein in the case that the nut is combined on the screw portion, a combining force applied along the axial direction of the fixing bolt obliquely combined to the fixing frame and the lens is dispersed into a vertical combining force directed from the front surface of the lens to the compression surface and a horizontal combining force directed to from the one side of the lens to the holder, respectively.

In either one of the lens fixing apparatuses according to the still further and yet further aspects of the present invention, the head comprises a long hole which is extensively formed to the lengthy direction.

BRIEF DESCRIPTION OF THE DRAWINGS

The above objects and other advantages of the present invention will become more apparent by describing the preferred embodiments thereof in more detail with reference to the accompanying drawings in which.

BEST MODE FOR CARRYING OUT THE INVENTION

Hereinbelow, a lens fixing apparatus of rimless spectacles according to the present invention will be described with reference to the accompanying drawings.

Figure 1:
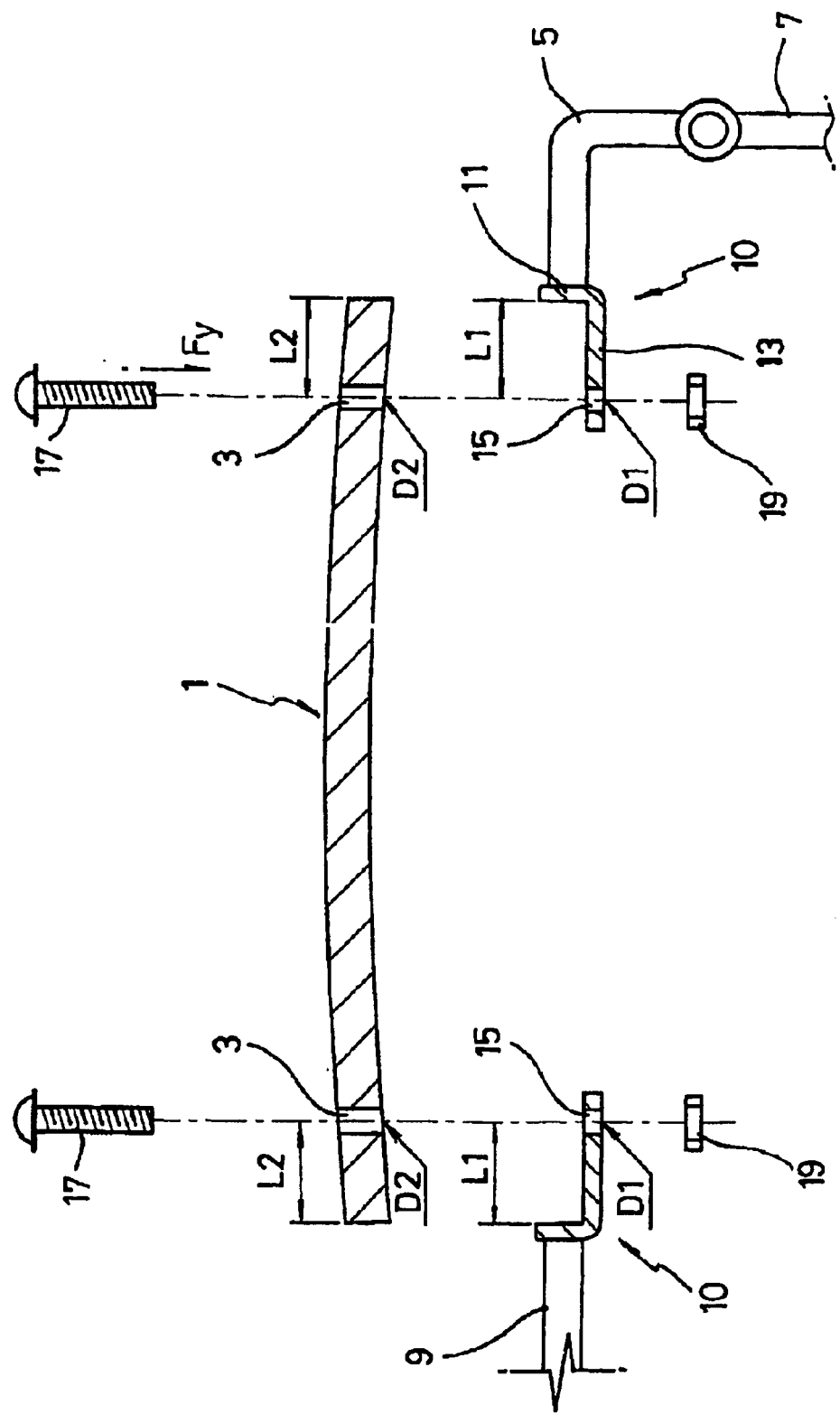
FIG. 1 is a sectional view schematically showing a lens fixing apparatus of rimless spectacles according to the prior art.
Figure 2:
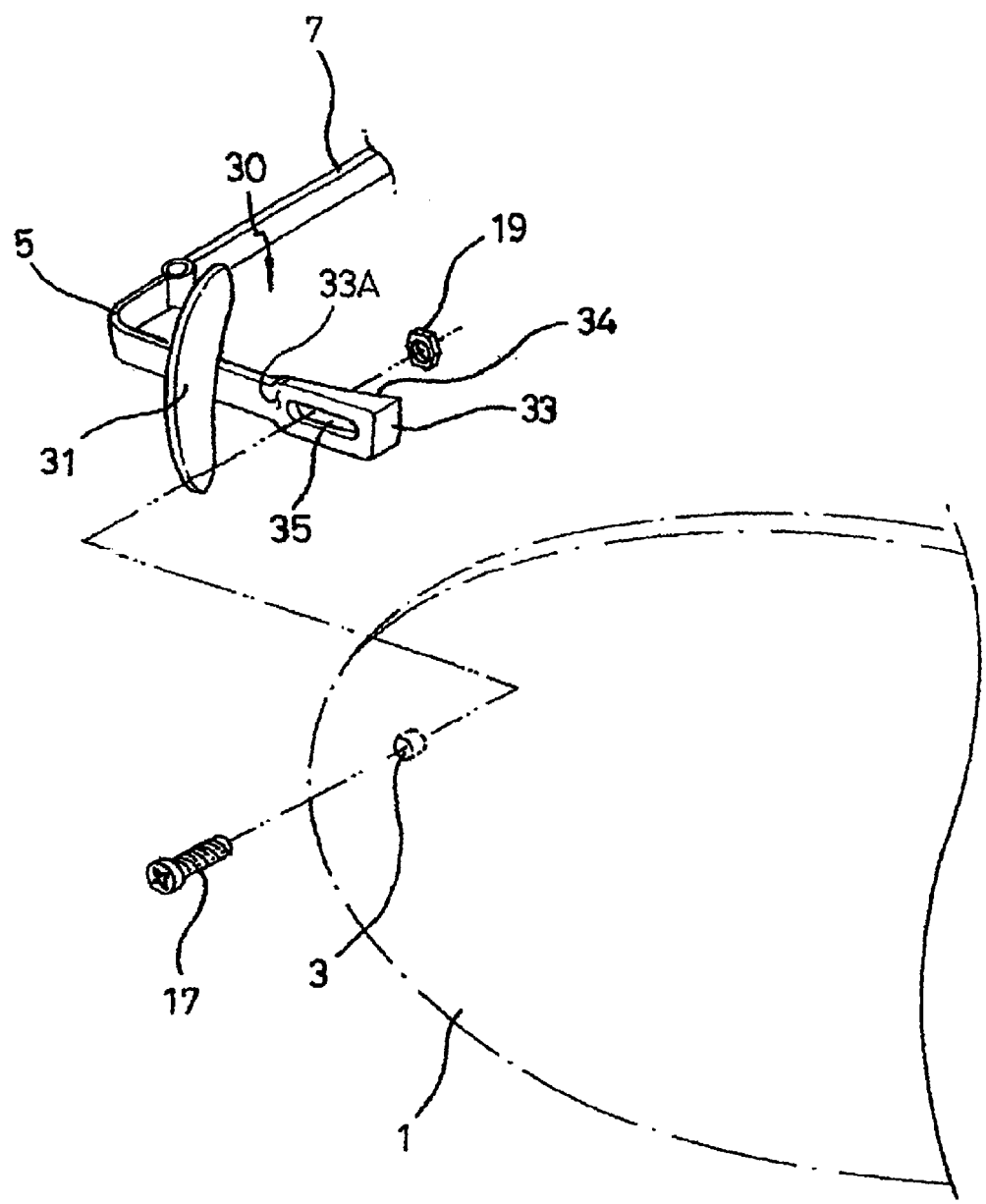
FIG. 2 is an exploded perspective view showing a lens fixing apparatus of rimless spectacles according to a first embodiment of the present invention.
Figure 3:
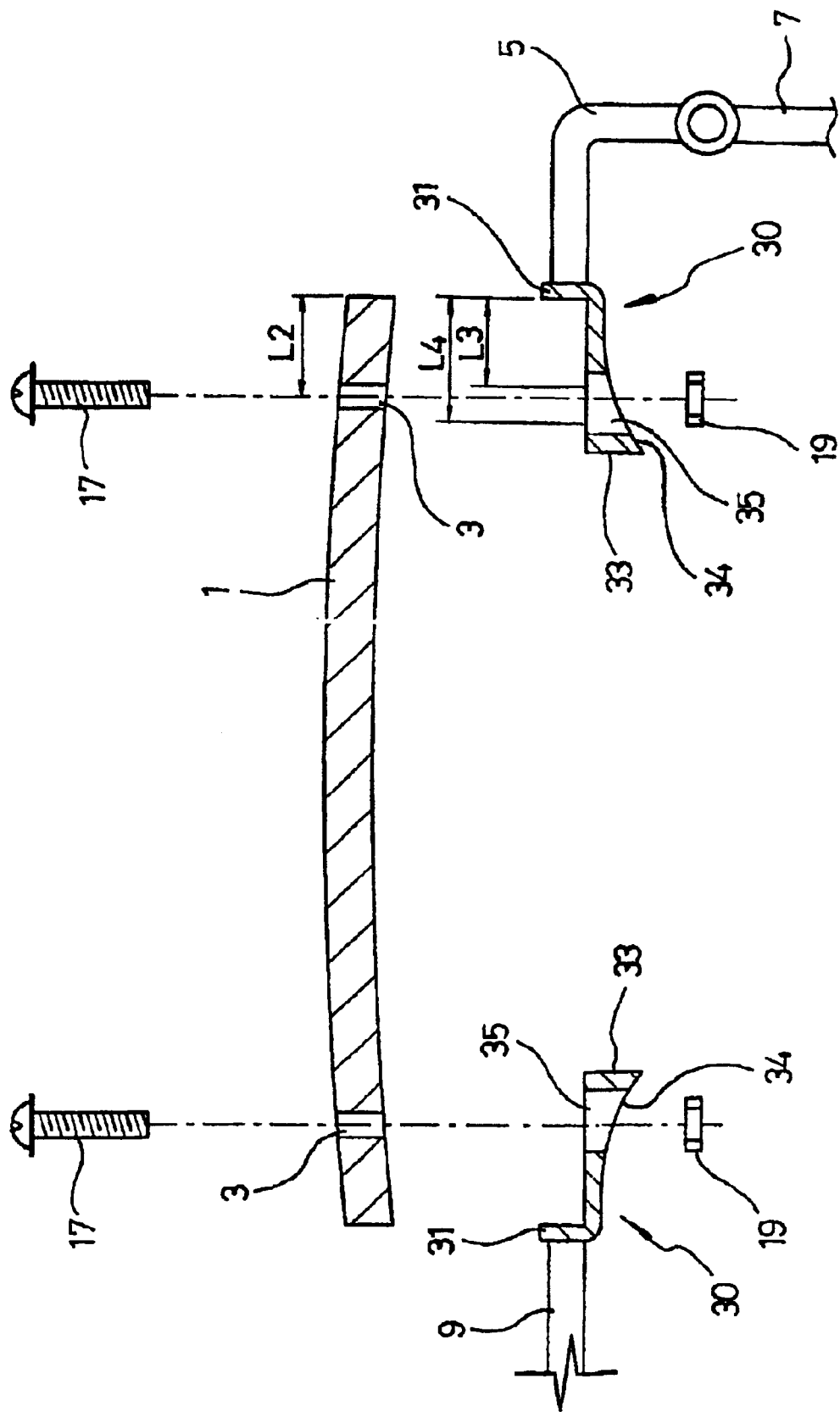
FIG. 3 is an exploded sectional view schematically showing a lens fixing apparatus of rimless spectacles according to the first embodiment of the present invention.

As shown in FIGS. 2 and 3, a holder formed in a lens fixing apparatus of rimless spectacles according to a first embodiment of the present invention is combined to one end of a bridge 9 and simultaneously combined to one end of a bending portion 5 along one temple 7 of the rimless spectacles. In this case, although a portion opposing the bridge 9 is not shown in FIG. 3, a holder formed in an opposing lens fixing apparatus is combined to the other end of the bridge 9 and the other temple of the rimless spectacles.

In the lens fixing apparatus 30, the inner circumferential surface of the lens fixing apparatus 30 closely contacts that of a lens 1, and a long hole 35 of a predetermined length is formed along the lengthy direction of the fixing frame 33, and a holder 31 is extensively formed perpendicularly with the fixing frame 33.

In this case, a distance L2 between a through-hole of the lens and the outer circumferential portion of the lens 1 is established within a range between a distance L3 from the inner side of the holder 31 to the starting portion of the long hole 35 and a distance L4 from the holder 31 to the ending portion of the long hole 35.

Meanwhile, a slanted surface is formed in the rear surface of the fixing frame 33 to have a gradually thinner thickness in the direction of the holder 31 and the slanted surface can be formed of one of a curved surface and a flat surface.

Figure 4A:
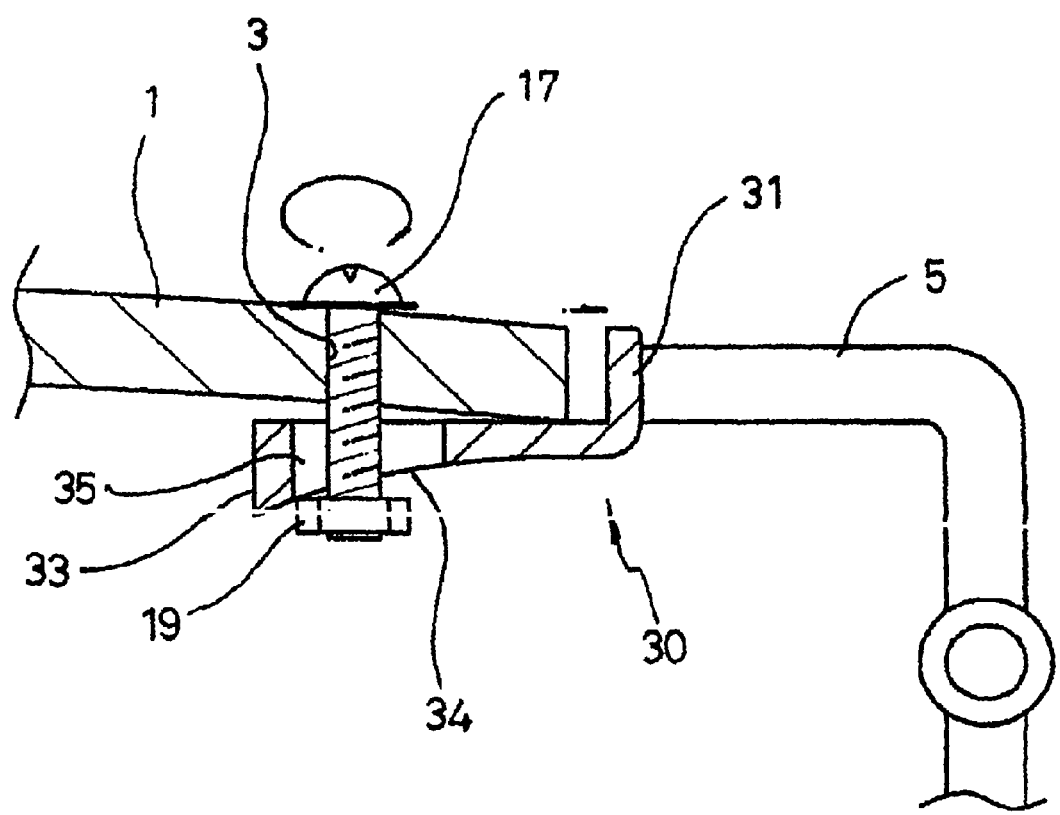
FIGS. 4A and 4B are schematic sectional views showing the states where a fixing bolt and a lens move along a long hole when a nut is engaged with the fixing bolt in order to combine the lens with the lens fixing apparatus of rimless spectacles according to the first embodiment of the present invention, respectively.
Figure 4B:
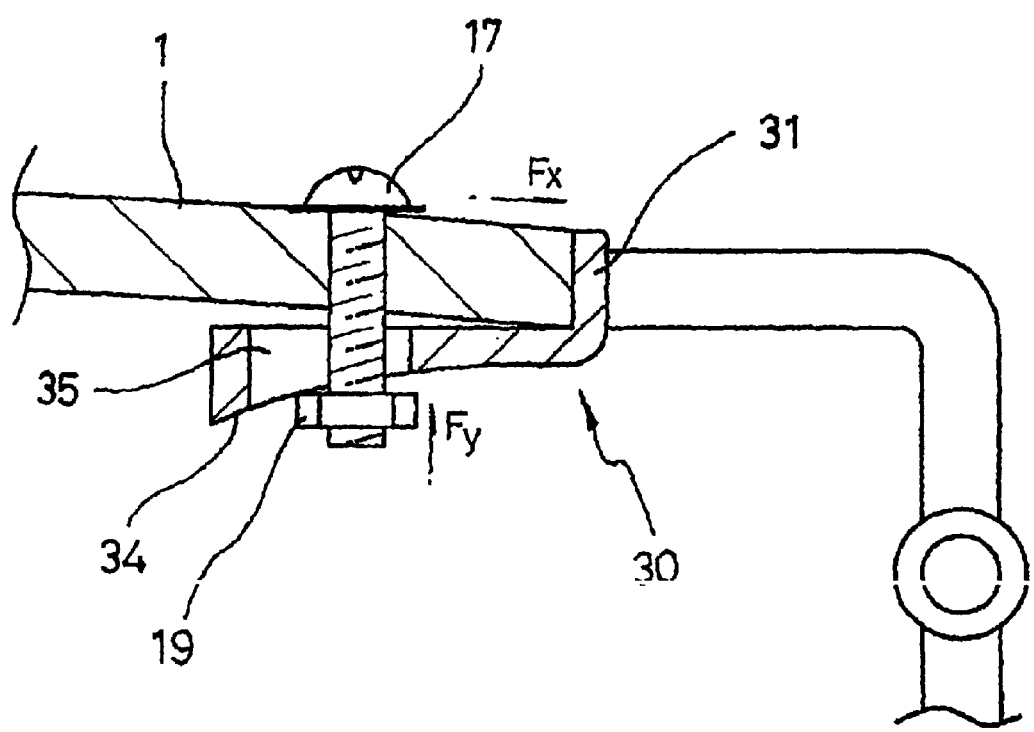

FIGS. 4A and 4B are schematic sectional views showing the states where a fixing bolt and a lens move along a long hole when a nut is engaged with the fixing bolt in order to combine the lens with the lens fixing apparatus according to the first embodiment of the present invention, respectively.

In the case that the lens 1 is combined to the lens fixing apparatus 30 according to the present invention as shown in FIG. 4A, the through-hole 3 through which a fixing bolt is penetratively engaged is formed on the lens 1 by means of a drilling work. In this case, it is preferable that a significant range L2 of the through-hole 3 which is worked on the lens 1 by a drilling worker is restricted into L3≦L2≦L4 as shown in FIG. 3.

As described above, since the significant range L2 where the through-hole 3 can be positioned is set with a more clearance than the conventional case, a range of an allowable error with respect to the perforation position of the through-hole 3 can be extended. It is possible to perforate a through-hole of the lens 1 at an appropriate position according to the curvature, the power and thickness of the lens 1. The through-hole 3 of the lens 1 can be quickly and easily worked.

Figure 6A:
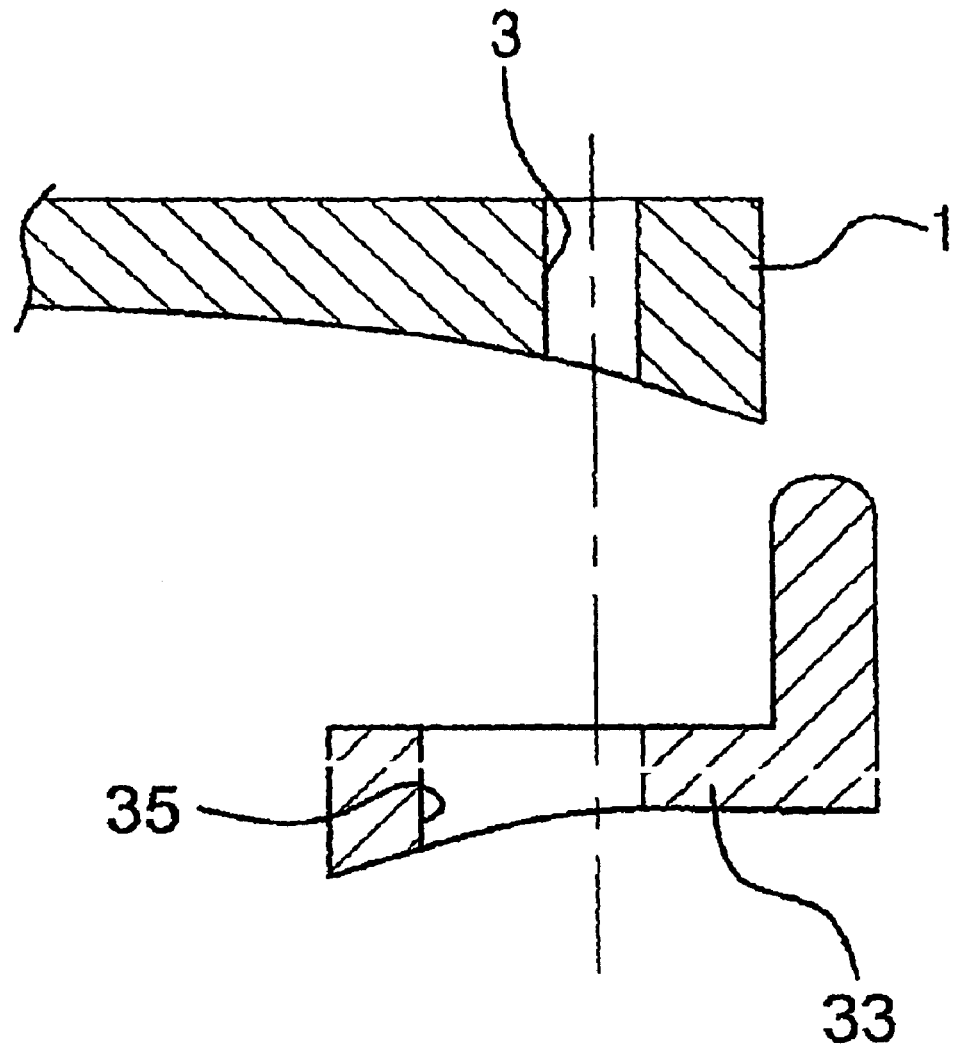
FIG. 6A is a schematic sectional view showing the position of a lens through-hole where a concave lens is combined with the lens fixing apparatus of rimless spectacles according to the first embodiment of the present invention.
Figure 6B:
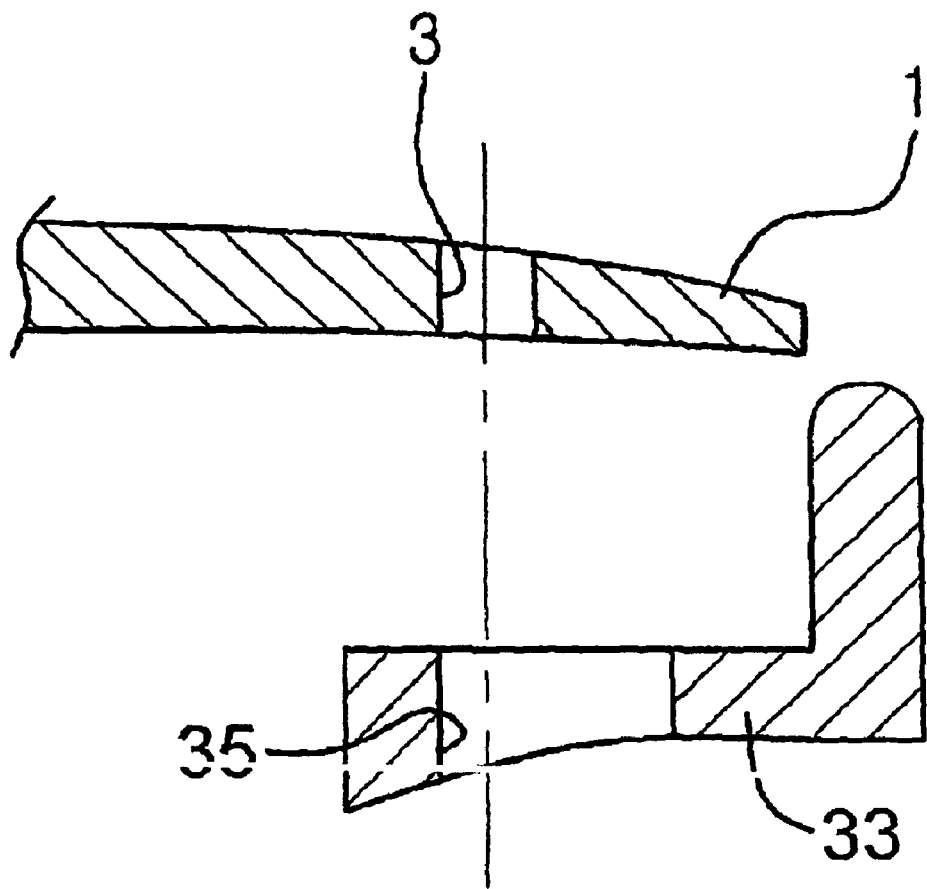
FIG. 6B is a schematic sectional view showing the position of a lens through-hole where a convex lens is combined with the lens fixing apparatus of rimless spectacles according to the first embodiment of the present invention.

For example, in the case that a lens is a high power of the concave lens since the long hole 35 is formed in each fixing frame 33, a perforation position of the through-hole 3 is moved to the outer side of the lens 1 as shown in FIG. 6A, to prevent a fixing bolt 17 from hiding the eyes of the user in advance. In the case that a lens is a convex lens, a perforation position of the through-hole 3 is moved to the inner side of the lens 1 having a relatively thicker thickness in comparison with the outer portion of the lens having a relatively thinner thickness, as shown in FIG. 6B, to thereby prevent the lens from being broken due to a combining force of the fixing bolt.

As described above, since the long hole 35 is formed in the fixing frame 33, a glasses expert takes the thickness, power and curvature of the lenses into consideration, to thereby make the through-hole 3 of the lens 1, so that a position establishment range of the through-hole 3 can be more widely applied, and to thus satisfy an optimal condition where the lens can be fixed to the fixing frame.

Meanwhile, as shown in FIG. 4A, a fixing bolt 17 is engaged through the through-hole 3 formed on the lens 1 and the long hole 35, and a nut 19 is temporarily engaged with the screw portion of the fixing bolt 17. Here, a gap can be formed between the end of the lens 1 and the holder 31, depending upon the position of the through-hole 3.

If the nut 19 is rotated in a coupling direction at this state, the nut 19 moves toward the holder 31 along the slope direction of the slanted surface 34, when part of the bottom of the nut 19 is pressed on the slanted surface 34. Simultaneously, the lens 1 is slidingly moved toward the holder 31 at the state of contacting the front surface of the fixing frame 34.

Accordingly, the fixing bolt 17 and the lens 1 are moved toward the inner side of the holder 31, and finally one end of the lens 1 is compressively fixed to the inner side of the holder 31. Then, the other end of the lens 1 is fixed to the lens fixing apparatus 30 combined to one end of the bridge 9, in the same processes as that of the one end of the lens 1. The remaining lens is also fixed to a pair of fixing units (not shown) in the same manner as that of the one lens.

At last, one end of the lens 1 is compressively fixed to the inner side of the holder 13 as shown in FIG. 4B, and the rear surface of the lens 1 is compressively fixed to a compression surface 33A of FIG. 2 in the fixing frame 33. As a result, the lens 1 is compressively fixed to the holder 31 firmly and the fixing frame 33, respectively, in two directions Fx and Fy, differently from the conventional one-direction compressive contact.

Accordingly, since the lens 1 is closely fixed toward the holder 31 without any gap between the side of the lens 1 and the holder 31 when the lens 1 is fixed to the fixing frame 33 by the fixing bolt 17 and the nut 19, the distortion of the lens 1 can be prevented. Further, loosening of the fixing bolt 17 and the nut 19 can be prevented.

Figure 5:
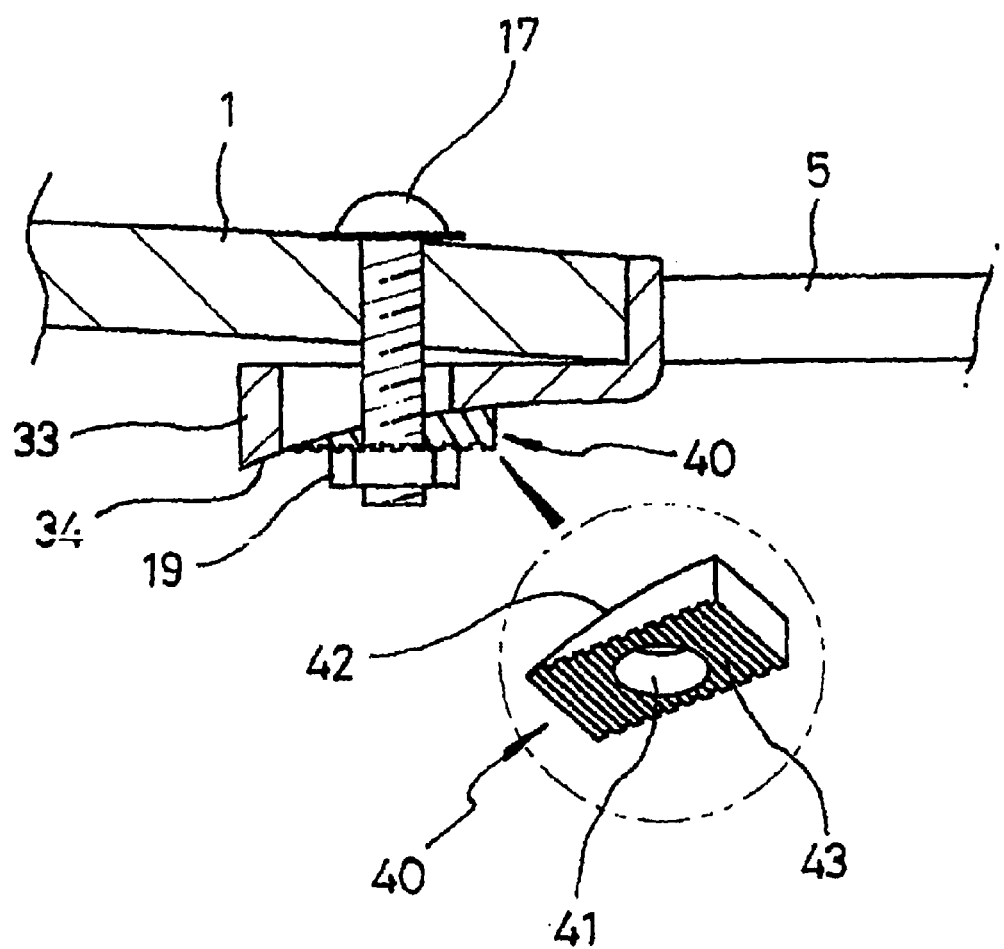
FIG. 5 is a schematic sectional view showing the state where a wedge is combined with the lens fixing apparatus of rimless spectacles according to the first embodiment of the present invention.

FIG. 5 is a schematic sectional view showing the state where a wedge is combined with the lens fixing apparatus according to the present invention.

As shown in FIG. 5, a wedge 40 has a through-hole 41 through which the fixing bolt 17 penetrates on the center thereof so that the wedge 40 can be inserted between the bottom of the nut 19 and the slanted surface 34 of the fixing frame 33. Here, a corresponding surface 42 is formed on one surface of the wedge 40 in correspondence to the slanted surface 34 and simultaneously the other surface of the wedge 40 having an uneven portion 43 is formed in parallel with the inner circumferential portion of the fixing frame 33. As a result, loosening of the fixing bolt 17 and the nut 19 which can happen since the nut 19 has been slid or the rimless spectacles have been worn for long time, can be prevented.

Thus, an eyeglasses expert who assembles the rimless spectacles can assemble the rimless spectacles quickly and easily. Also, since both ends of the lens 1 are compressively combined to the inner circumferential surface of a pair of holders, a lens, abridge and a temple of the rimless spectacles are prevented from being distorted around the fixing bolt 17 in advance at the time of wearing the rimless spectacles.

Figure 7A:
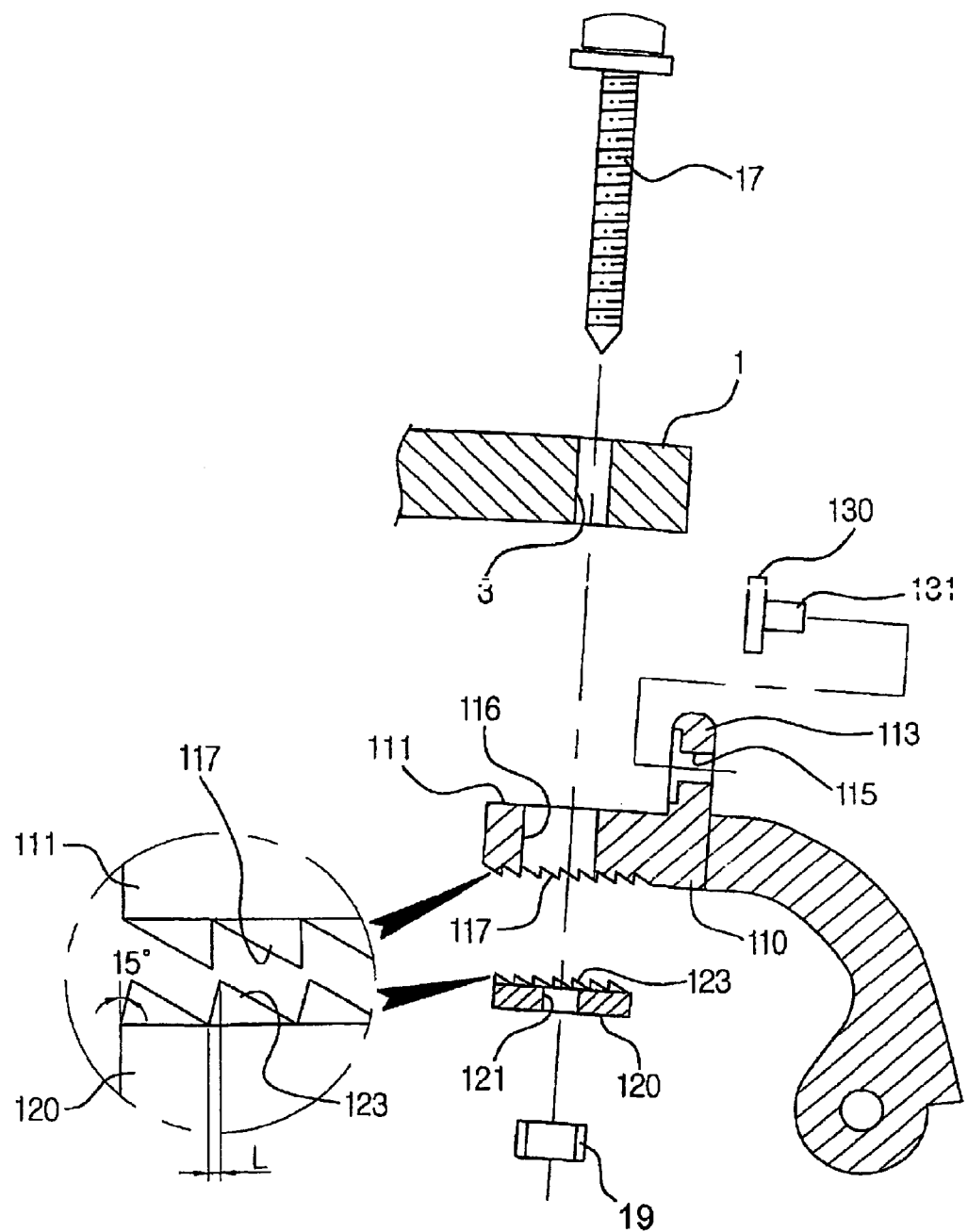
FIG. 7A is a sectional view showing a disassembled state of a lens fixing apparatus of rimless spectacles according to a second embodiment of the present invention.
Figure 7B:
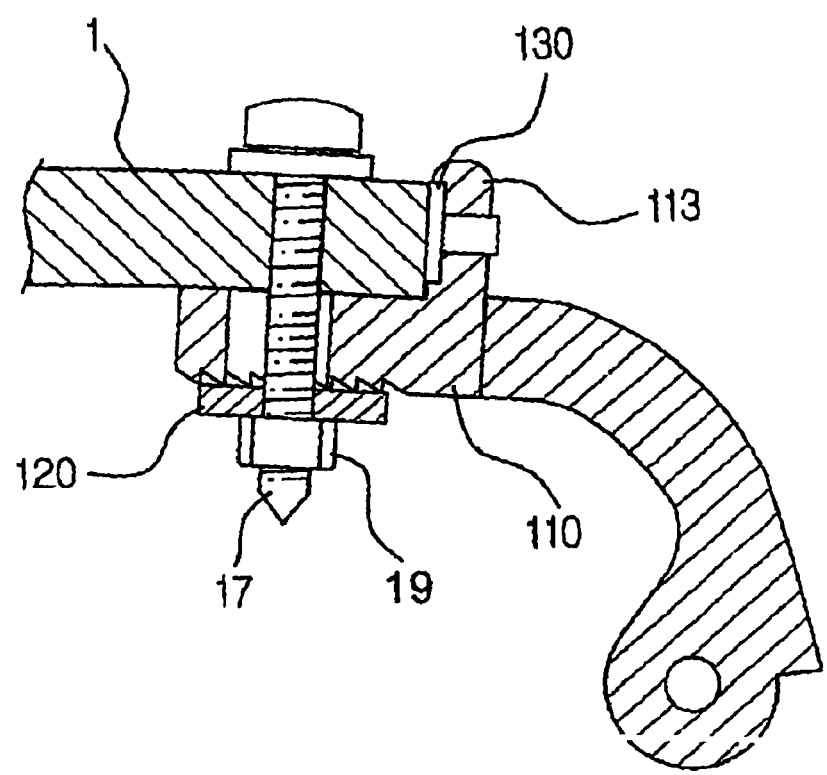
FIG. 7B is a sectional view showing an assembled state of a lens fixing apparatus of rimless spectacles according to a second embodiment of the present invention.
Figure 8:
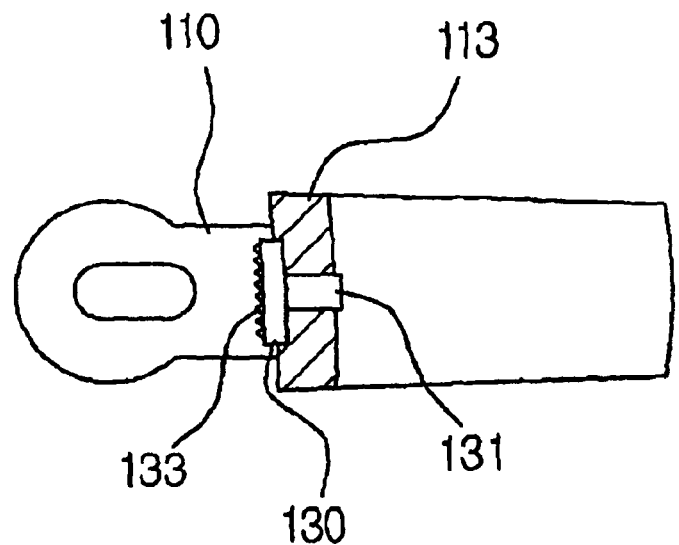
FIG. 8 is a front view showing the state where a fixing unit is combined with the lens fixing apparatus of rimless spectacles according to the second embodiment of the present invention.

FIG. 7A is a sectional view showing a disassembled state of a lens fixing apparatus of rimless spectacles according to a second embodiment of the present invention. FIG. 7B is a sectional view showing an assembled state of a lens fixing apparatus of rimless spectacles according to a second embodiment of the present invention. FIG. 8 is a front view showing the state where a fixing unit is combined with the lens fixing apparatus of rimless spectacles according to the second embodiment of the present invention. FIGS. 9A through 9L are schematic views showing various embodiments of the fixing units of the lens fixing apparatus of rimless spectacles according to the second embodiment of the present invention.

First, as shown in FIG. 7A, a lens fixing apparatus of rimless spectacles according to a second aspect of the present invention, includes a fixing frame 110 having a compression surface 111 extensively formed on one end of a temple of the rimless spectacles (not shown) and whose front surface compressively contact the rear surface of a lens 1.

In the fixing frame 110, a holder 113 in which the side surface of the lens 1 compressively contacts one side of the compression surface 111 is formed perpendicularly to the compression surface 111, and a first sawtooth-shaped uneven portion 117 of a predetermined length is formed on the rear surface of the fixing frame 110, made of a plurality of protrusions each whose one surface is vertical and other surface is slanted.

Also, a long hole 116 is penetratively formed on the center of the fixing frame 110, in which the long hole has a predetermined length along the lengthy direction of the fixing frame 110, so that an allowable error range with respect to a perforation position of a through-hole 3 can be extended at the time of perforating the through-hole 3 of the lens with which the fixing bolt 17 is combined manually by a glasses expert as in the first embodiment of the present invention.

Accordingly, an eyeglasses expert takes the thickness, power and curvature of the lens into consideration, to thereby make the through-hole 3 of the lens 1 so that a position establishment range of the through-hole 3 can be more widely applied, and to thus satisfy an optimal condition where the lens can be fixed to the fixing frame. Since the lens 1 is strongly closely fixed toward the holder 113 without any gap between the side of the lens 1 and the holder 31 when the lens 1 is fixed to the fixing frame 117 by the fixing bolt 17 and the nut 19, the distortion of the lens 1 can be prevented. Further, loosening of the fixing bolt 17 and the nut 19 can be prevented.

As shown in FIGS. 7A and 7B, a sawtooth-shaped washer 120 includes a second sawtooth-shaped uneven portion 123 made of a plurality of protrusions whose one surface is vertical and other surface is slanted, in one surface of the saw-tooth washer 120, so as to be engaged with the first sawtooth-shaped uneven portion 117 in the fixing frame 110. A through-hole 121 through which the fixing bolt 17 penetrates is formed in the center of the fixing frame 110.

Meanwhile, when the lens 1 is fixed to the fixing frame 110, the second sawtooth-shaped uneven portion in the sawtooth-shaped washer 120 is properly closely stuck to the first sawtooth-shaped uneven portion 117 in the fixing frame 110, and the sawtooth-shaped washer 120 is slid by a predetermined distance "L" with respect to a holder 113 and combined with the holder 113 as shown in FIG. 7A. Accordingly, a fixing work of the lens can be simply and firmly done, which improves a work efficiency.

In this case, in order to make one side surface of the lens 1 much strongly compressively contact toward the holder 113 as the first and second sawtooth-shaped uneven portions 117 and 123 are engaged with each other, it is preferable that one side of the first sawtooth-shaped uneven portion 117 is perpendicularly formed and one side of the second sawtooth-shaped uneven portion 123 corresponding to the perpendicular surface of the first sawtooth-shaped uneven portion 123 is slanted by a predetermined angle, for example, about 15°.

Meanwhile, it is also possible to form a sawtooth-shaped uneven portion only in one surface of the opposing surfaces of the fixing frame 110 and the sawtooth-shaped washer 120, in which case a sawtooth-shaped uneven portion is formed in any one having a stronger quality of the fixing frame 110 and the sawtooth-shaped washer 120. When the fixing bolt 17 is engaged by the nut 19, a stronger quality of the sawtooth-shaped uneven portion eats into a weaker quality of the sawtooth-shaped uneven portion by a predetermined depth. Thus, it is preferable that the fixing frame 110 and the sawtooth-shaped washer 120 are made of materials of respectively different strengths so that a firm bonding is achieved. Accordingly, the sawtooth-shaped washer 120 or lens 1 can be prevented from being slid from the fixing frame 110 due to a vibration or mechanical shock during wearing.

Meanwhile, when the lens 1 is fixed to the fixing frame 110 by coupling units such as the fixing bolt 17 and the nut 19, a fixing unit 130 having a fixing protrusion 131 which is inserted so as to be bonded by an adhesive or to be fixed by an adhesive to a fitting hole 115 which is hilly formed in the center portion of the holder 113, is disposed to be engaged without any gap between the lens 1 and the holder 113.

In this case, the fixing unit 130 is made of an elastic material. The other side of the fixing unit 130 is maintained to elastically support one side of the lens 1, to thereby eradicate a possible gap between the lens 1 and the holder 113 and absorb a vibration and a mechanical shock during wearing the rimless spectacles. As a result, the lens 1 can be prevented from being bent from the fixing frame 110 in advance.

Figure 9A:
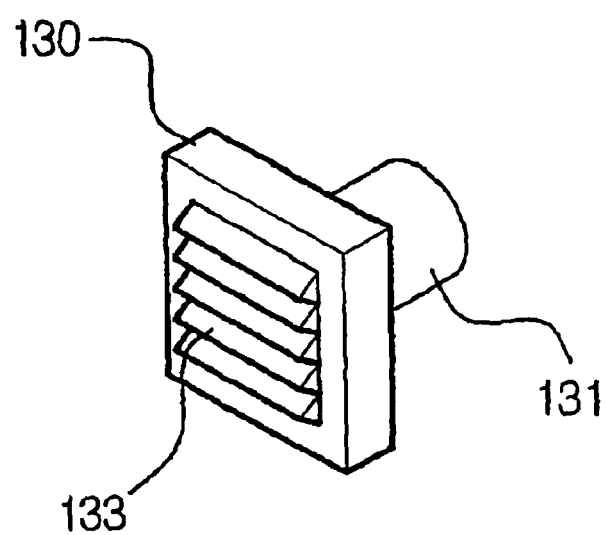
FIGS. 9A through 9L are schematic views showing various embodiments of the fixing units of the lens fixing apparatus of rimless spectacles according to the second embodiment of the present invention.
Figure 9B:
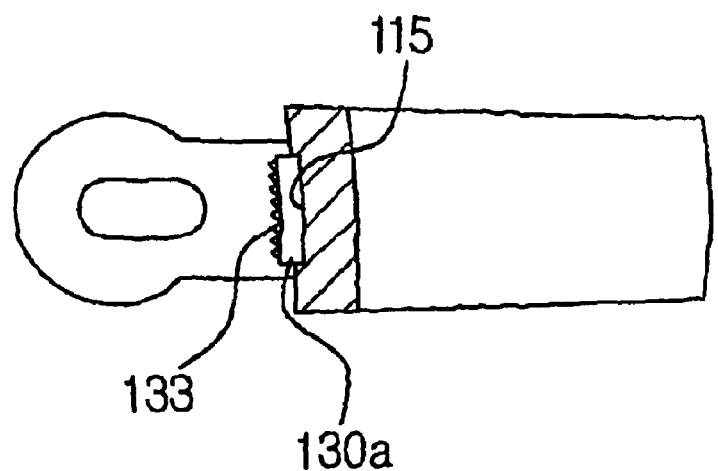
Figure 9C:
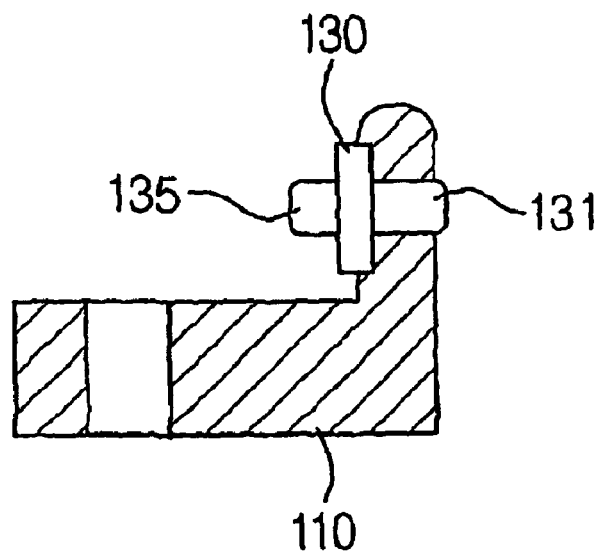
Figure 9D:
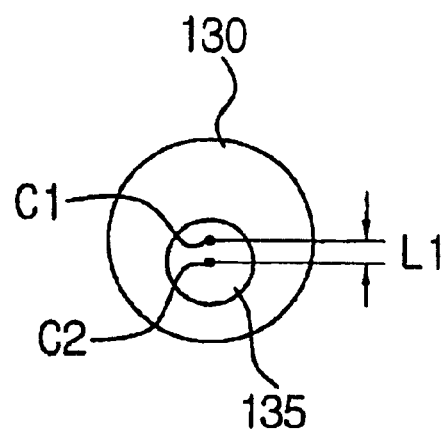
Figure 9E:
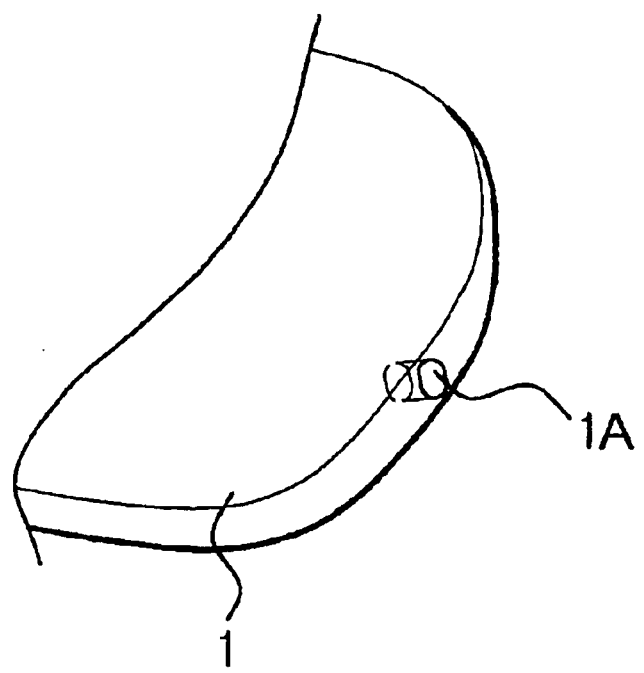
Figure 9F:
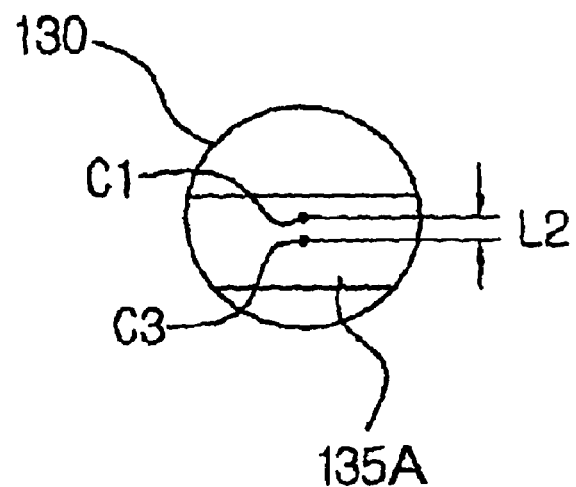

The fixing unit 130 includes a coupling protrusion 131 whose central portion is formed in a substantial rectangular plate shape as shown in FIGS. 8 and 9A, or a circular plate shape as shown in FIGS. 9D and 9F, and which is inserted into a coupling hole 115 in the holder 113. Meanwhile, the fixing unit 130 includes protrusions 133 on the other side thereof which is closely stuck to one side of the lens 1 as shown in FIGS. 8 and 9A, to thereby enhance a combining force with respect to the lens 1.

Meanwhile, as shown in FIG. 9C, the fixing unit 130 includes a fixing protrusion 131 on one side thereof, and is formed in a circular plate shape so as to rotate around the fixing protrusion 131.

In this case, as shown in FIG. 9D, a cylindrical eccentric protrusion 135 whose center C1 is eccentrically disposed by a predetermined distance L1 from the center C1 of the fixing unit 130 is formed in the other side of the fixing unit 130.

As a result, the eccentric protrusion 135 is inserted into an insertion hole 1A formed in the side surface of the lens 1 in correspondence to the eccentric protrusion 135 as shown in FIG. 9E. If the insertion hole 1A of the lens has not been formed in a right position, for example, if the insertion hole 1A of the lens is positioned out of the right position, the eccentric protrusion 131 can be inserted into the insertion hole 1A of the lens while rotating the body of the fixing unit 130 around the fixing protrusion 131.

Accordingly, one side of the lens 1 is prevented from being slid along the inner side of the holder 113 by a mechanical shock or vibration, to thereby prevent the lens from being bent.

Figure 9G:
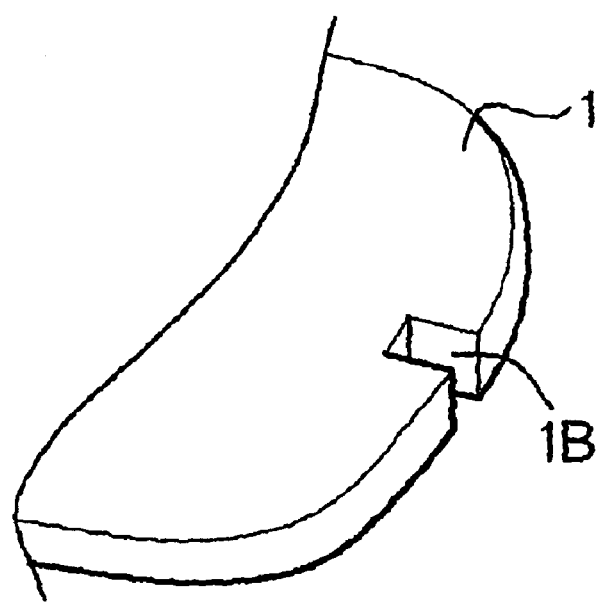

In this case, as shown in FIG. 9F, an eccentric protrusion 135A is formed in a substantial rectangular shape. The center C3 of the eccentric protrusion 135A is eccentrically disposed by a predetermined distance L2 from the center C1 of the fixing unit 130. Here, it is preferable that a groove 1B corresponding to the shape of the eccentric protrusion 135A is formed in the side surface of the lens 1 as shown in FIG. 9G.

Meanwhile, in the case that a lens is made of a resin lens which is not so easy to be broken, for example, a polycarbonate lens, a polyamid lens etc., the fixing unit 130 includes a sharp pad-shaped protrusion portion instead of the insertion protrusion. Accordingly, when a lens 1 is fixed to the fixing frame 110, the pad-shaped protrusion portion is maintained to compulsively eat into one side surface of the lens 1, to thereby firmly support the side surface of the lens. As a result, the lens 1 can be prevented from being bent during wearing. As described above, the fixing unit can be selectively used according to a material of the lens.

Meanwhile, as shown in FIG. 9B, it is possible to form a pad-shaped fixing unit 130A in which a fixing protrusion 131 is omitted in one side of the fixing unit 130 and a protrusion portion 133 is formed in the other side thereof. Here, since an adhesive material is coated on the protrusion portion 133 contacting one side surface of the lens 1, a combining force with respect to the lens 1 is increased.

Also, an adhesive material is coated on the other side of the pad-shaped fixing unit 130A closely contacting the lens, without any protrusions 133, or a rubber coating or an urethane series resin is thinly coated, to thereby enhance a frictional force between the lens 1 and the fixing unit 130A and to thus prevent the lens 1 from being twisted.

Figure 9H:
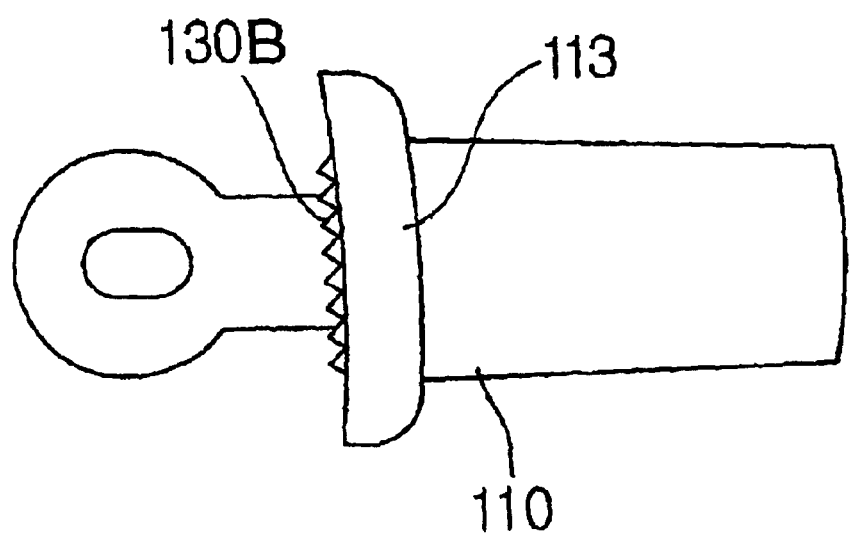

Meanwhile, the fixing units 130 and 130A are combined with the holder 133 attachably and detachably. As shown in FIG. 9H, the fixing unit 130B is formed in an uneven shape, so that the fixing unit 130B is compressively fixed to the lens 1, to then enhance a combining force with respect to the side surface of the lens, and is protruded integrally with the holder 113 in the inner side of the holder 113.

Figure 9I:
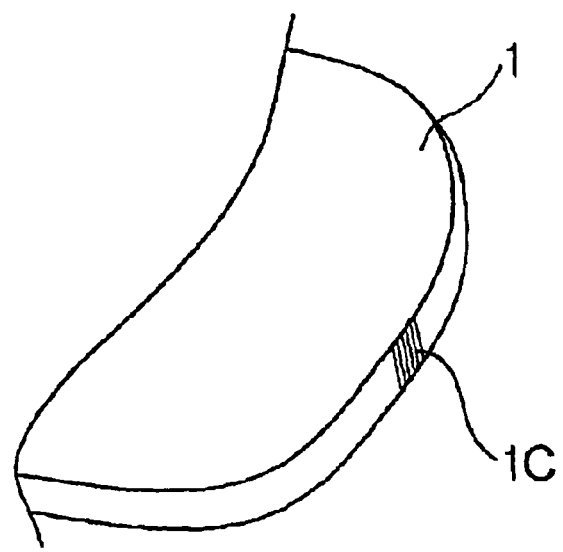

In this case, a predetermined uneven surface 1C is formed in advance, at a position where the unevenly shaped holder 130B is compressively stuck to the lens 1, by use of a tool such as a fine, as shown in FIG. 9I. Accordingly, a free movement between the lens 1 and the fixing unit 130B is suppressed due to a strong combining force in the uneven portion which occurs when the fixing unit 130B and the uneven surface 1C are mutually compressively stuck to each other, to thereby prevent the lens 1 from being bent.

Figure 9J:
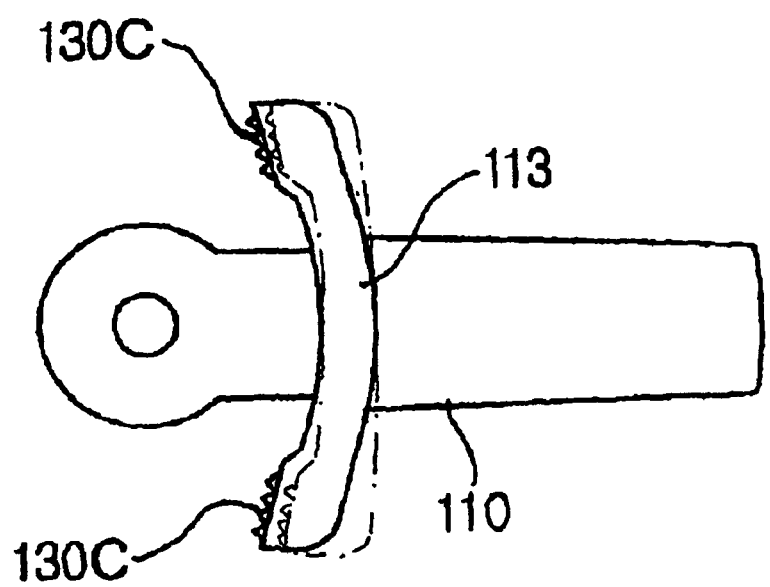

Here, as shown in FIG. 9J, the fixing unit 130C is integrally formed with the holder 113A. Both the inner sides of the holder 113A formed in a shape corresponding to the lateral shape of the lens 1 are formed in an uneven shape, respectively. At the same time, the holder 113A is made of an elastic material, in order to compressively support the lens 1.

Figure 9K:
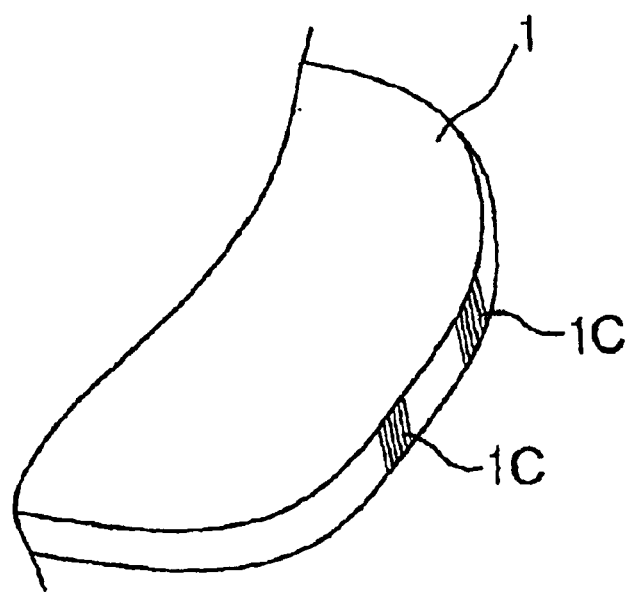

Further, as shown in FIG. 9K, predetermined uneven surfaces 1C are formed in advance, at a position where the pair of unevenly shaped fixing units 130C is compressively stuck to the lens 1, by use of a tool such as a fine. Accordingly, due to a strong combining force which occurs when the pair of the fixing units 130C and the pair of the uneven surfaces 1C are mutually compressively stuck to each other, the lens 1 is prevented from being bent.

Figure 9L:
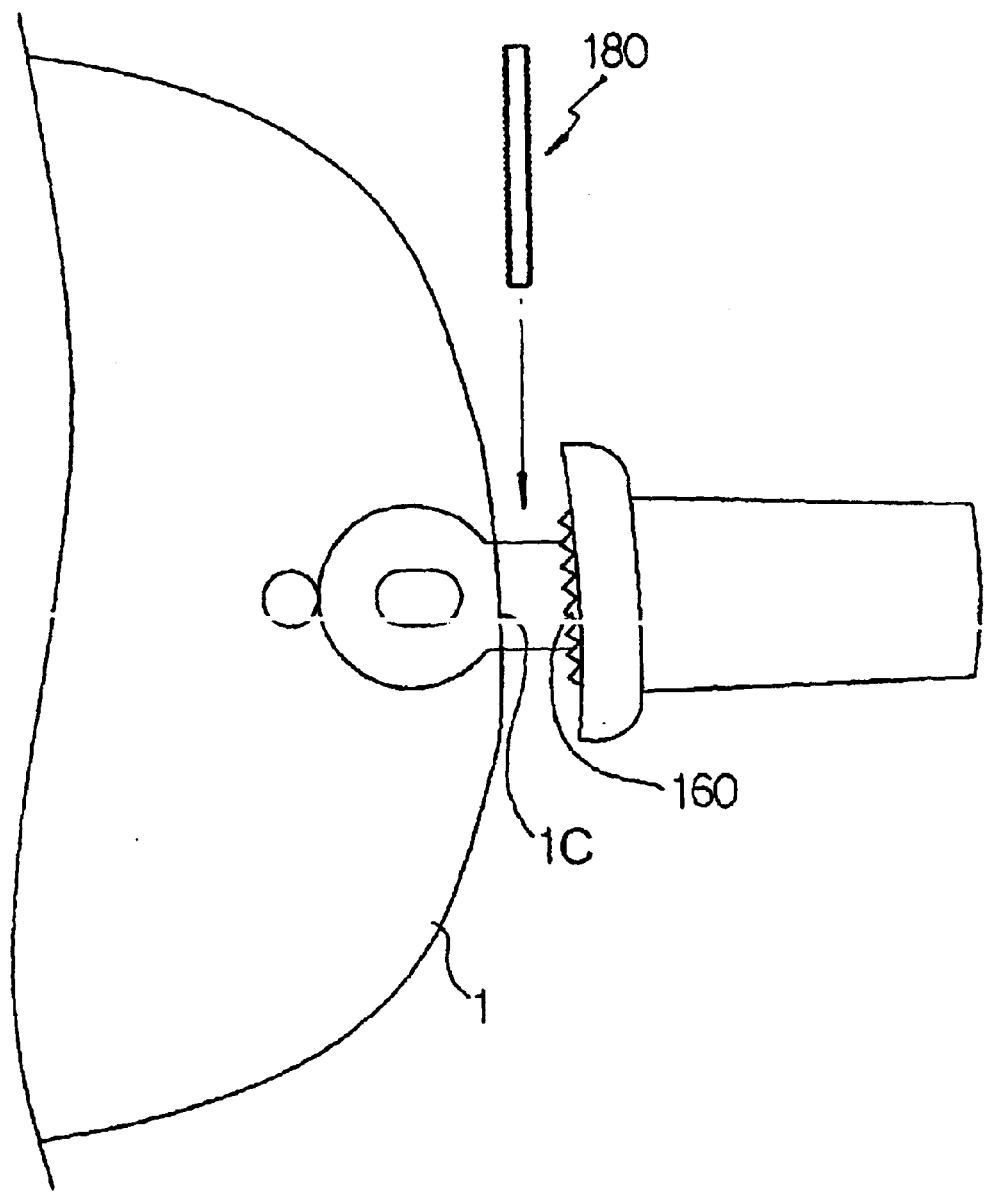

Meanwhile, in order to more firmly and fixedly support the lens, a cushion member 180 of a soft quality material where an adhesive is coated on both surfaces thereof as shown in FIG. 9L, is disposed between the side surface of the lens 1 and the unevenly shaped fixing unit 130B integrally formed with the holder, to thereby enhance a fixing force of the lens 1. In this case, the cushion member 180 is preferably embossed minutely so that both surfaces of the cushion member 180 are easily stuck to the uneven surface 1C of the lens and the fixing unit 130B.

Figure 10A:
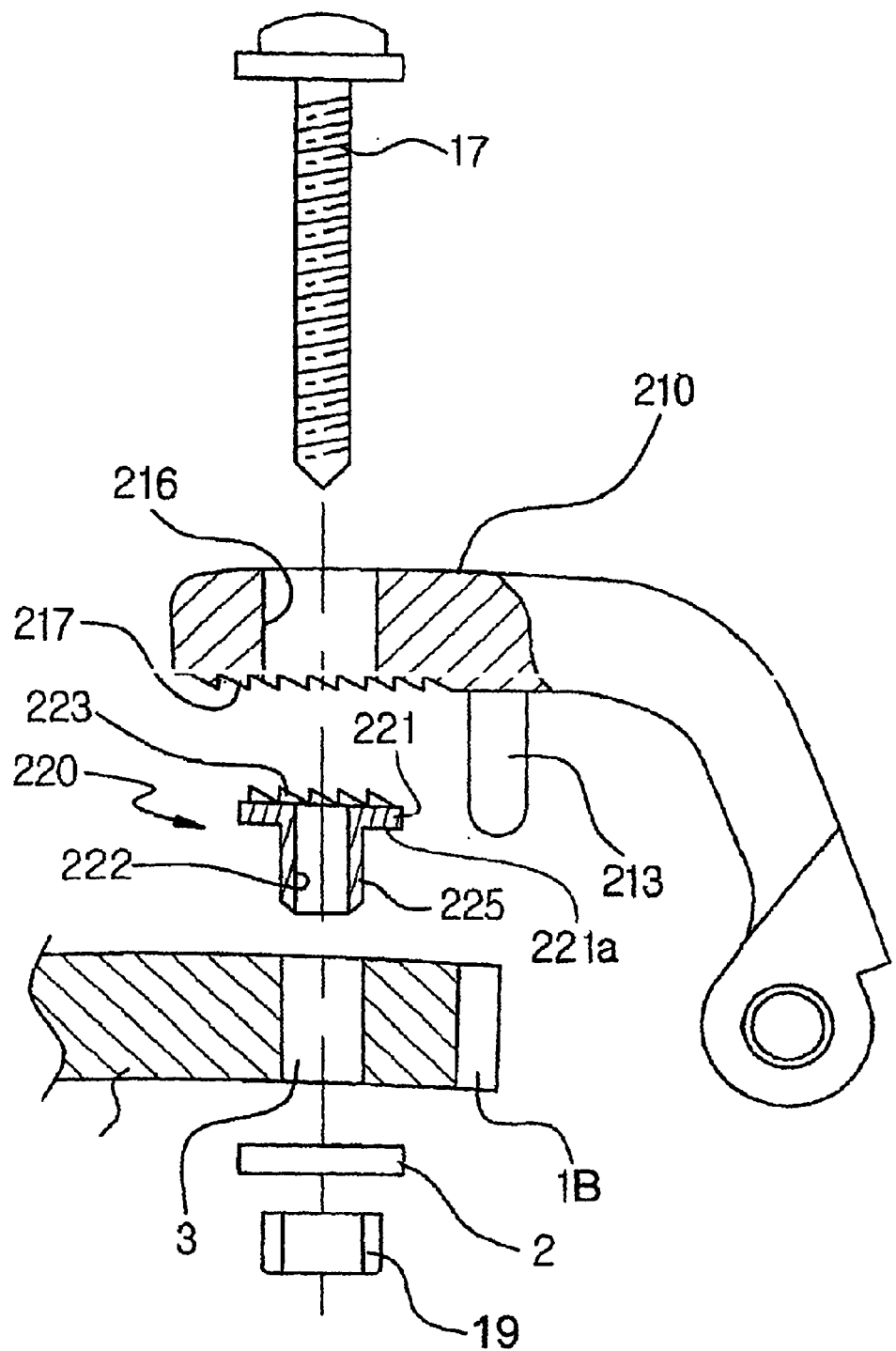
FIG. 10A is a sectional view showing a disassembled state of a lens fixing apparatus of rimless spectacles according to a third embodiment of the present invention.
Figure 10B:
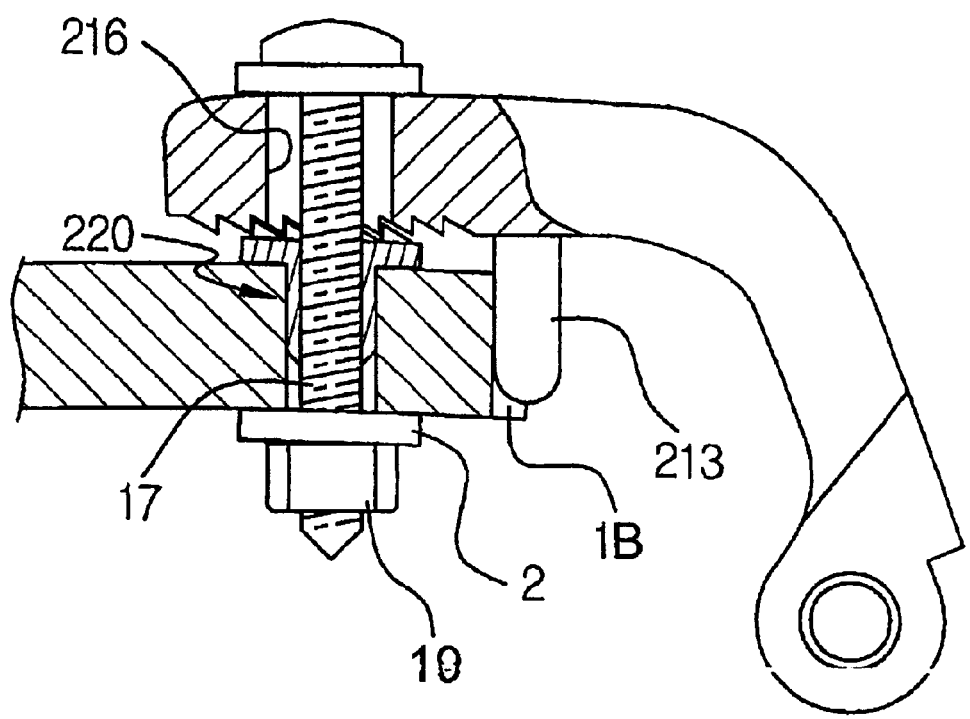
FIG. 10B is a sectional view showing an assembled state of an uneven lens fixing apparatus of rimless spectacles according to a third embodiment of the present invention.

FIG. 10A is a sectional view showing a disassembled state of a lens fixing apparatus of rimless spectacles according to a third embodiment of the present invention, and FIG. 10B is a sectional view showing an assembled state of a lens fixing apparatus of rimless spectacles according to the third embodiment of the present invention.

A third embodiment of the present invention is same as that of the second embodiment of the present invention, in that a washer is tooth-engaged with the fixing frame in a slidable state through the first and second sawtooth-shaped uneven portions formed in the fixing frame and the washer, respectively. However, the third embodiment shown in FIG. 10A differs from the second embodiment of the present invention, in that a sleeve washer 220 is disposed between the lens 1 and the fixing frame 210.

In this case, the fixing frame 210 includes a first sawtooth-shaped uneven portion 217 formed of a plurality of protrusions each of which one side surface is vertical and other surface is slanted in the rear surface of the fixing frame in corresponding to the front surface of the lens 1. A pin-shaped holder 213 which is inserted into a groove 1B of the lens in the one side direction of the rear surface thereof, is formed perpendicularly with respect to the rear surface of the fixing frame.

Meanwhile, the sleeve washer 220 includes a compression surface 221A which is compressively stuck to the front surface of the lens 1, in one side of the sleeve washer 220, and a supporter 221 having a second sawtooth-shaped uneven portion 223 formed of a plurality of protrusions each of which one side surface is vertical and other surface is slanted, so as to be tooth-engaged with the first sawtooth-shaped uneven portion 217 of the fixing frame 210, in the other side of the sleeve washer 220.

Also, a cylindrical extension 225 which is extensively formed in the vertical direction of the compression surface 221A thus having a through-hole 222 in the inner side of the cylindrical extension 225, is formed in the compression surface 221A of the supporter 221. Here, the extension 225 is inserted into the through-hole 3 of the lens and supported to the lens 1.

Here, the fixing bolt 17 is penetratively coupled with the long hole 216 of the fixing frame, the through-hole 222 of the sleeve washer, and the through-hole 3 of the lens, in turn. Then, a flat washer 2 and a nut 19 are engaged in one end of the fixing bolt 17, in order to fix the lens 1 to the fixing frame 210.

As described above, in the third embodiment of the present invention as in the second embodiment thereof, the lens 1 and the holder 213 are combined without forming any gap through a coupling of the first and second sawtooth-shaped uneven portions. As a result, the third embodiment can prevent the lens from being bent or the fixing bolt 17 and the nut 19 from being loosened, due to a vibration and a mechanical shock during wearing of the rimless spectacles.

Figure 11:
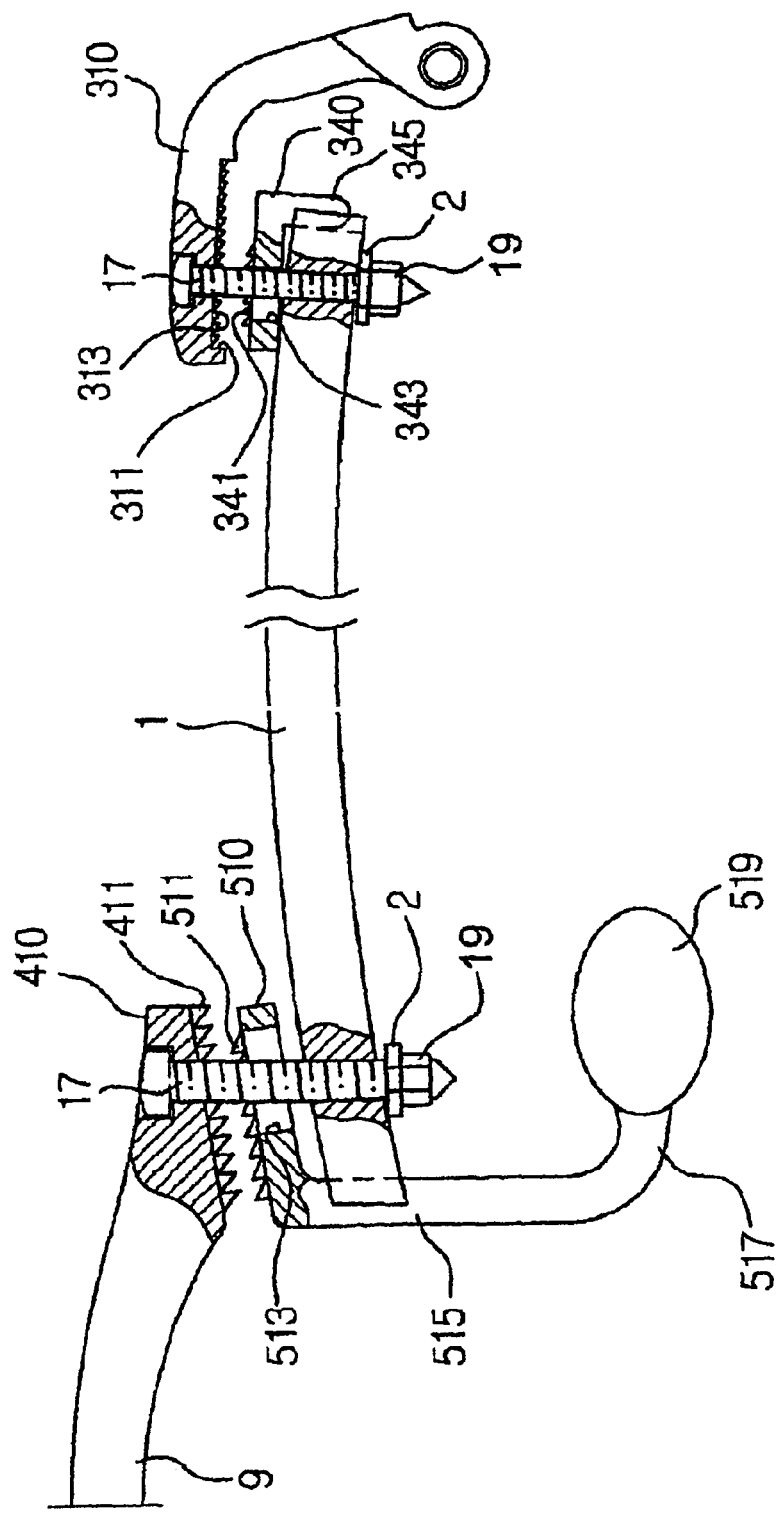
FIG. 11 is a partly cutout sectional view showing a lens fixing apparatus of rimless spectacles according to a fourth embodiment of the present invention.

FIG. 11 is a partly cutout sectional view showing a lens fixing apparatus of rimless spectacles according to a fourth embodiment of the present invention.

The fourth embodiment of the present invention is same as the second and third embodiments, in that a pair of sawtooth-shaped uneven portions which are engaged slidingly with each other. However, the fourth embodiment of the present invention differs from the second and third embodiments, in that a holder 345 compressively stuck to one side of the lens 1 is formed extensively and perpendicularly with the moving supporter 340 so as to be separated from the fixing frame 310.

Here, the fixing frame 310 includes a groove 311 of a predetermined length along the lengthy direction of the fixing frame. A first sawtooth-shaped uneven portion 313 is formed in the groove 311.

Also, a second sawtooth-shaped uneven portion 341 engaged with the first sawtooth-shaped uneven portion 313 is formed along the lengthy direction in one side of the moving supporter 340. A long hole 343 penetrating the second sawtooth-shaped uneven portion 341 is formed in the moving supporter 340 and a holder 345 is extensively and perpendicularly with respect to the lengthy direction of the moving supporter 340 in one side thereof.

Here, the fixing frame 310, the moving supporter 340 and the lens 1 are fixedly combined with coupling units such as a fixing bolt 17, a flat washer 2 and a nut 19 in turn. The front surface of the lens 1 is compressively stuck to the rear surface of the moving supporter 340, according to a coupling of the first and second sawtooth-shaped uneven portions 313 and 341, and one side surface of the lens 1 is closely fixed to the holder 345.

In this case, a fixing frame 410 is extensively formed in one side of the bridge 5 and a first sawtooth-shaped uneven portion 411 is formed in the rear surface of the fixing frame 410.

Also, a moving supporter 510 bent and extensively formed in the leading end of a nose stay 517 includes a second sawtooth-shaped uneven portion 511 formed in the front surface of the moving supporter 510, and a log hole 513 formed in the center of the moving supporter 510, in which the second sawtooth-shaped uneven portion 511 is engaged with the first sawtooth-shaped uneven portion 411.

Here, the nose stay 517 is mutually fixed by coupling units such as the fixing bolt 17, the flat washer 2 and the nut 19. The moving supporter 510 is slid along the fixing frame 410 by the first and second sawtooth-shaped uneven portions 411 and 511 and then fixed.

As described above, in the fourth embodiment of the present invention, the moving supporters 340 and 510 including the fixing frames 310 and 410 and the holders 345 and 515 are separated from the fixing frame each other. Accordingly, it is possible to adjust a gap between temples of the rimless spectacles into a predetermined interval. As a result, the rimless spectacles according to the present invention can be put on conveniently to the head of a wearer.

The combining methods performed by the first and second sawtooth-shaped uneven portions have been described in the second through fourth embodiments. However, a fifth embodiment of the present invention will be described with a structure of fixing a lens to a fixing frame through a wedge-shape combining method.

Figure 12:
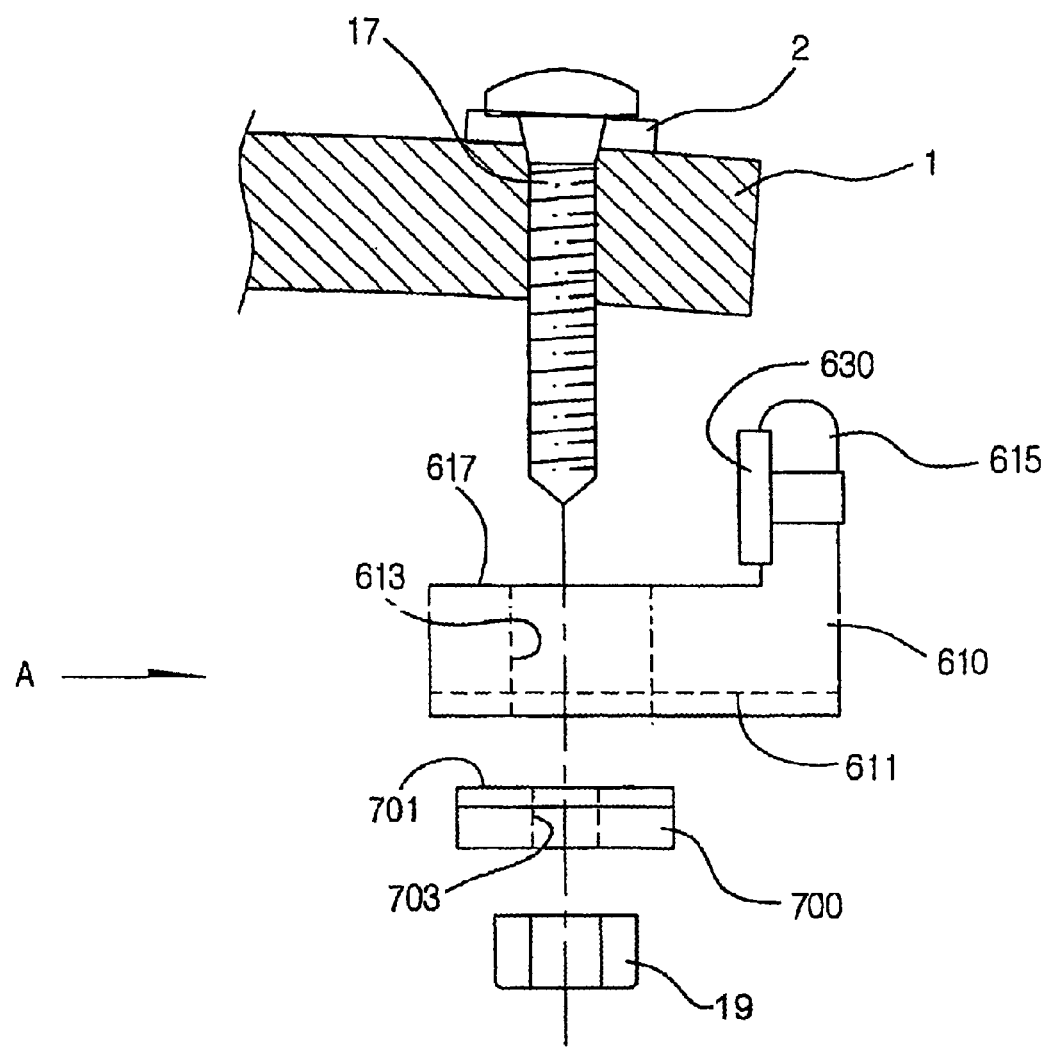
FIG. 12 is a partly cutout sectional view showing a lens fixing apparatus of rimless spectacles according to a fifth embodiment of the present invention.
Figure 13:
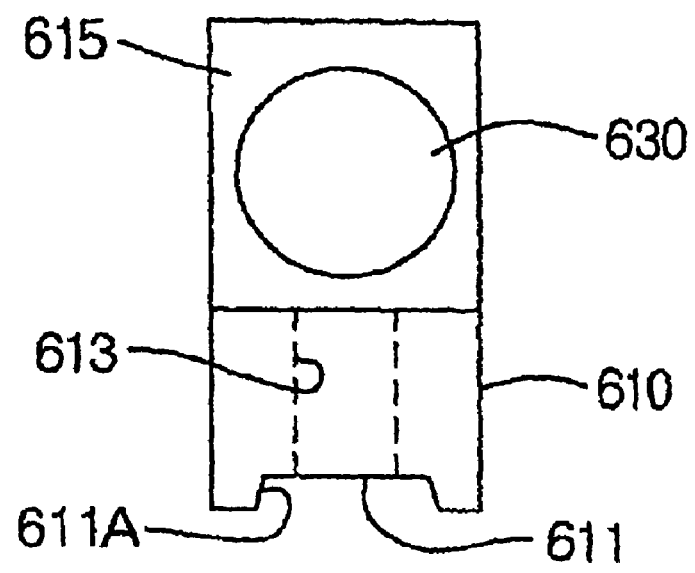
FIG. 13 is a side view showing the state viewed from a position "A" of FIG. 12.
Figure 13:
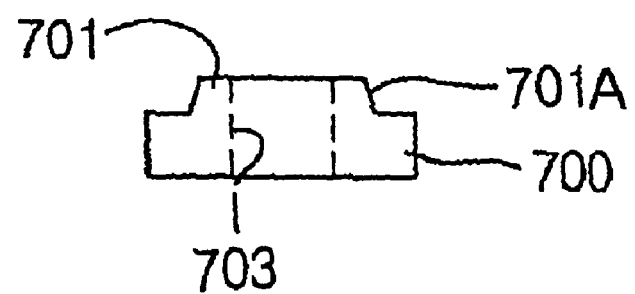
Figure 14:
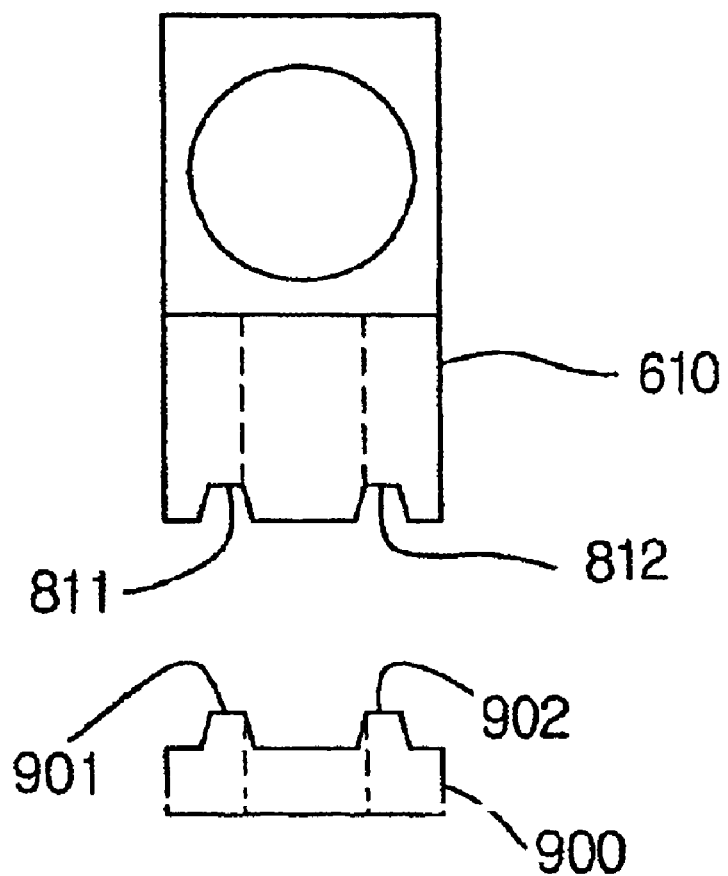
FIG. 14 is a side view showing variants of a fixing frame and a washer in the lens fixing apparatus of rimless spectacles according to a fifth embodiment of the present invention.

FIG. 12 is a partly cutout sectional view showing a lens fixing apparatus of rimless spectacles according to a fifth embodiment of the present invention. FIG. 13 is a side view showing the state viewed from a position "A" of FIG. 12. FIG. 14 is a side view showing variants of a fixing frame and a washer in the lens fixing apparatus of rimless spectacles according to a fifth embodiment of the present invention.

First, the fifth embodiment of the present invention includes a slanted groove 611 having a first slanted surface 611A of a predetermined angle which is formed by both sides of a fixing frame 610, in the rear surface of the fixing frame 610. Also, the fifth embodiment of the present invention includes a wedge-shaped washer 700 having a protrusion 701 having a second slanted surface 701A corresponding to the first slanted surface 611A so as to be wedge-combined with the slanted groove 611A.

In this case, the protrusion 701 in the wedge-shaped washer 700 is preferably formed to be wedge-combined with the slanted groove 611, so that the second slanted surface 701A has a larger slanted angle than the first slanted surface 611A.

Also, a fixing unit 630 is disposed in the holder 615, as in the second through fourth embodiments of the present invention, to thereby prevent the lens 1 from being bent.

A combining sequence of the fifth embodiment of the present invention will be described below in sequence.

First, the fixing bolt 17 is penetratively inserted into the lens 1, the long hole 610 of the fixing frame 610, and the through-hole 713 of the wedge-shaped washer 700, in turn, and then the nut 19 is loosely temporarily engaged with the fixing bolt 17, Then, the wedge-shaped washer 700 is slidingly moved in the direction of the holder 615 along the slanted groove 611 in the fixing frame 610, until one side of the lens 1 is closely stuck to the inner side of the fixing unit 630 or the holder 615.

In this state, if the nut 19 is completely engaged with the fixing bolt 17, the protrusion 701 is wedge-combined with the slanted groove 611. Finally, the lens 1 is compressed in two directions such that one side surface of the lens 1 is compressed toward the holder 615 and simultaneously the rear surface of the lens 1 is compressed toward the compression surface 617 of th fixing frame 610. Thus, the lens 1 can be firmly fixed to the fixing frame 610 without being bent due to a vibration and a mechanical shock.

Further, the wedge-shaped washer 700 and the fixing frame 610 are wedge-combined with each other, and thus the wedge-shaped washer 700 is prevented from being pushed during wearing in an opposing direction to that compressed toward the holder 615 when the washer 700 has been combined. As a result, a fixing force of the lens 1 and the fixing frame 610 is enhanced.

In this case, as a modification as shown in FIG. 14, it is also possible to use slanted grooves 811 and 812 of the fixing frame 610 and protrusions 901 and 902 of the wedge-shaped washer 900 which are formed in a multiplicity along the lengthy direction thereof.

Figure 15A:
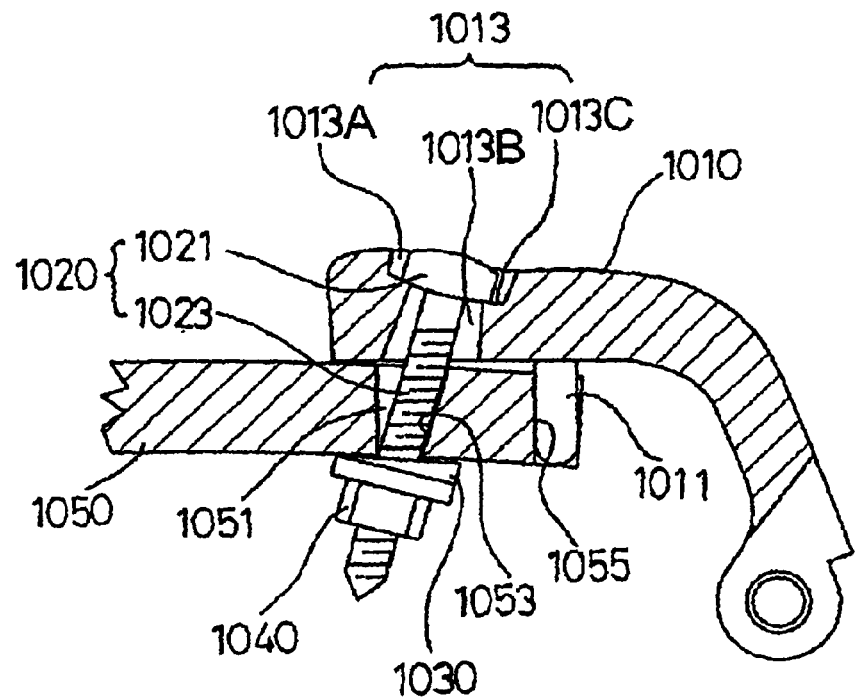
FIG. 15A is a partly cutout sectional view showing a lens fixing apparatus of rimless spectacles according to a sixth embodiment of the present invention.
Figure 15B:
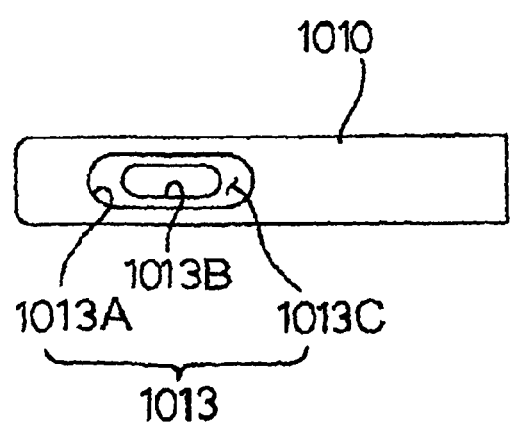
FIG. 15B is a front view showing a fixing frame in the lens fixing apparatus of rimless spectacles according to the sixth embodiment of the present invention.
Figure 15C:
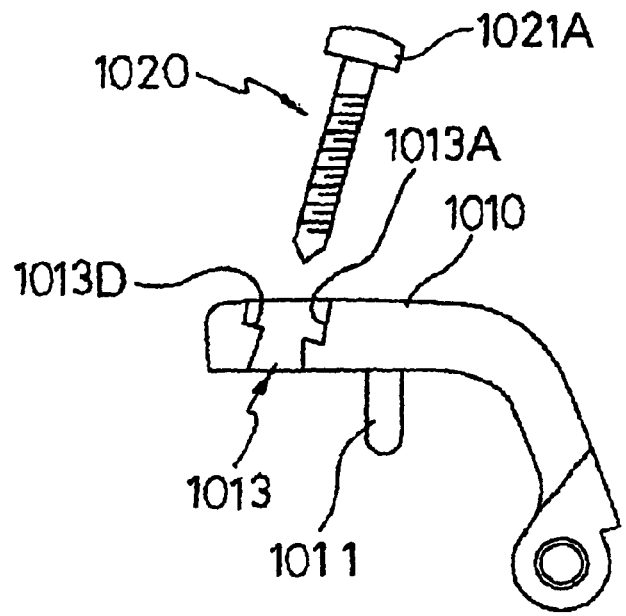
FIG. 15C is a partly cutout sectional view showing the state where a fixing bolt is disassembled from the fixing frame in the lens fixing apparatus of rimless spectacles according to the sixth embodiment of the present invention.
Figure 15D:
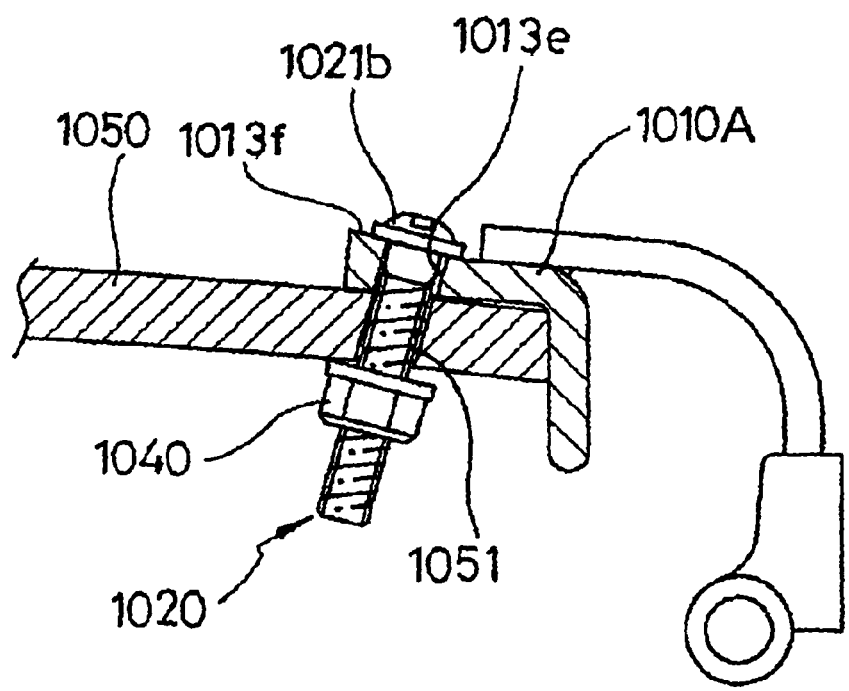
FIG. 15D is a partly cutout sectional view showing the state where a fixing bolt is obliquely disposed at a predetermined angle in the lens fixing apparatus of rimless spectacles according to the sixth embodiment of the present invention.
Figure 16:
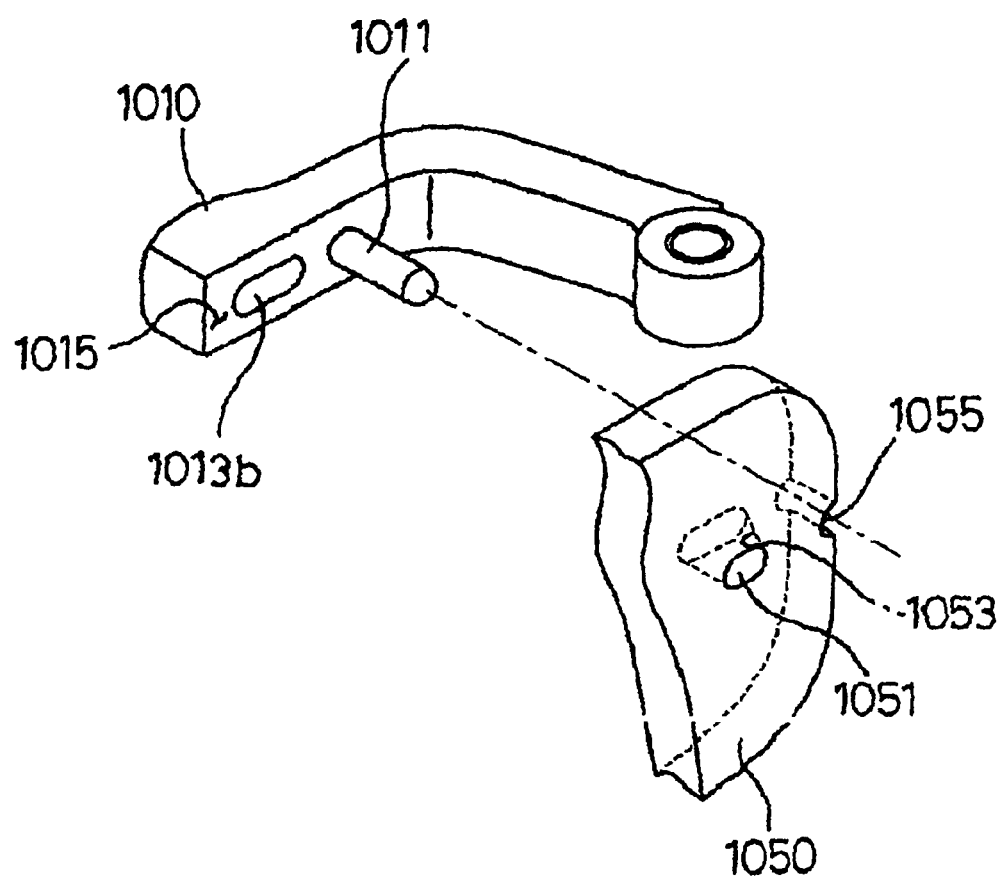
FIG. 16 is a schematic perspective view showing a lens applied in a fixing frame of the lens fixing apparatus of rimless spectacles according to the sixth embodiment of the present invention.
Figure 17:
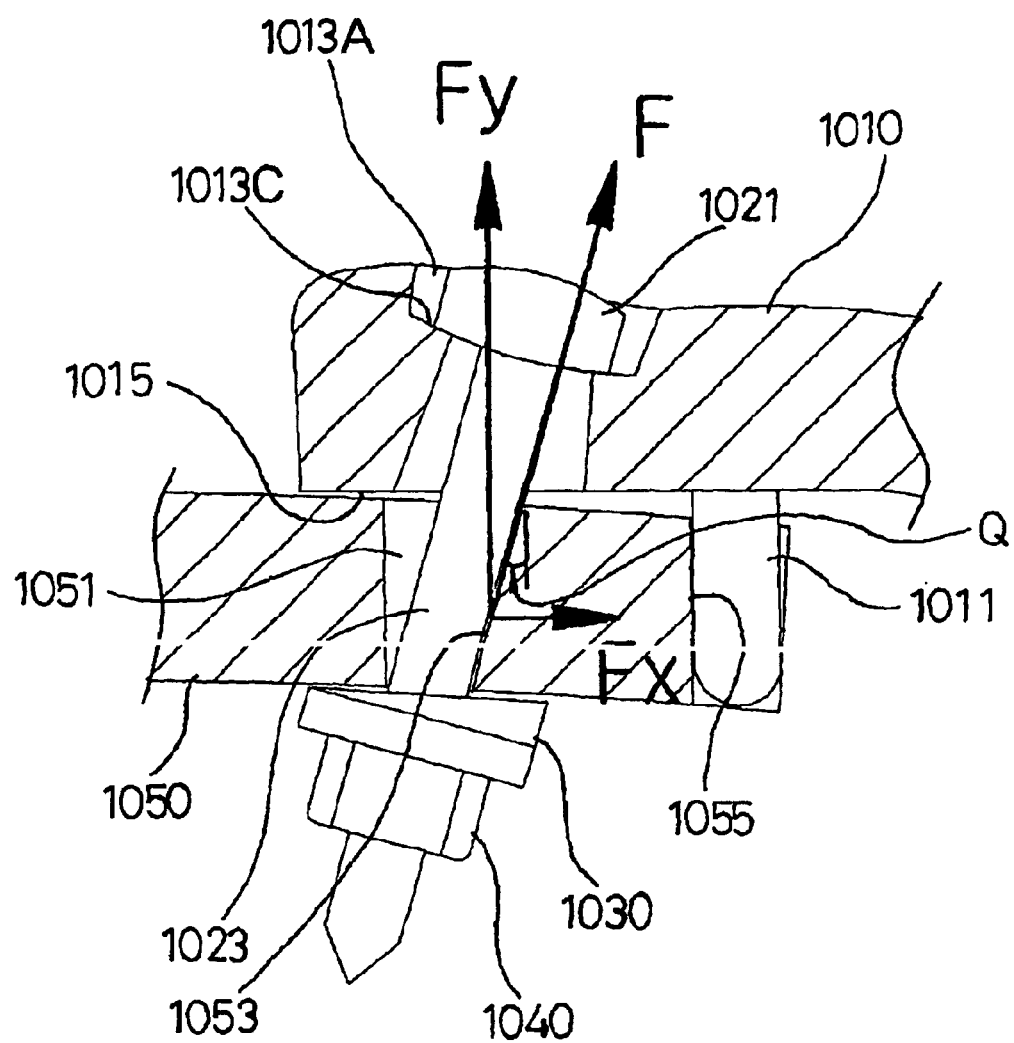
FIG. 17 is a view showing the state where a combining force F with respect to the axial direction of a fixing bolt is dispersed when a nut is combined with a fixing bolt in the lens fixing apparatus of rimless spectacles according to the sixth embodiment of the present invention.

FIG. 15A is a partly cutout sectional view showing a lens fixing apparatus of rimless spectacles according to a sixth embodiment of the present invention. FIG. 15B is a front view showing a fixing frame in the lens fixing apparatus of rimless spectacles according to the sixth embodiment of the present invention. FIG. 15C is a partly cutout sectional view showing the state where a fixing bolt is disassembled from the fixing frame in the lens fixing apparatus of rimless spectacles according to the sixth embodiment of the present invention. FIG. 15D is a partly cutout sectional view showing the state where a fixing bolt is obliquely disposed at a predetermined angle in the lens fixing apparatus of rimless spectacles according to the sixth embodiment of the present invention. FIG. 16 is a schematic perspective view showing a lens applied in a fixing frame of the lens fixing apparatus of rimless spectacles according to the sixth embodiment of the present invention. FIG. 17 is a view showing the state where a combining force F with respect to the axial direction of a fixing bolt is dispersed when a nut is combined with a fixing bolt in the lens fixing apparatus of rimless spectacles according to the sixth embodiment of the present invention.

First, a lens fixing apparatus of the rimless spectacles according to a sixth embodiment of the present invention can be applied to a fixing frame which is hinge-connected to a temple of the spectacles (not shown) or to abridge (not shown).

In the following embodiment, a fixing frame 1010 hinge-fixed to a temple of a pair of spectacles will be described.

As shown in FIG. 16, the fixing frame 1010 includes a compression surface 1015 to which the front surface of the lens is compressively stuck in the inner side surface of the fixing frame 1010 and a holding pin 1011 protruding perpendicularly from the compression surface 1015 in the center of the fixing frame 1010.

Here, as shown in FIG. 15, in the case that the lens 1050 is fixed to the fixing frame 1010 by a fixing bolt 1020 to be described below, a groove 1055 corresponding to the holding pin 1011 is preferably formed so that one side of the lens 1050 is fixed by the holding pin 1011.

Also, the fixing frame 1010 includes a first through-hole 1013 formed between one end of the fixing frame and the holding pin 1011. As shown in FIGS. 15A and 15B, the first through-hole 1013 is formed so that a front through-hole portion 1013A where a head 1021 of the fixing bolt 1020 is safely seated in the front thereof is of a level difference from a rear through-hole portion 1013B through which a screw 1023 passes.

Accordingly, the front through-hole portion 1013A is formed to be somewhat larger than the head 1021 so that the head 1021 of the fixing bolt 1020 is pivotally mounted along a stepped surface 1013C of the front through-hole portion 1013A in the bottom surface of the head 1021. In this case, it is preferable that the stepped surface 1013C of the front through-hole portion 1013A and the bottom surface of the head 1021 are rounded into a predetermined curvature so as to face-contact each other.

Also, the lower through-hole portion 1013B is formed in a long hole shape having a predetermined length so that the screw 1023 can be moved when the head 1021 of the fixing bolt 1020 is pivoted along the stepped surface 1013C.

Meanwhile, the lens 1050 includes a second through-hole 1051 on the lens 1050, so that the fixing bolt 1020 is obliquely combined with the lens 1050. The second through-hole 1051 is formed in a long hole shape in one side thereof and a circular shape in the other side thereof so that a slanted surface having a slope is formed in one side thereof. Accordingly, a combining force F occurring when the nut 1040 is tightened with the screw 1023 of the fixing bolt 1020, is dispersed in two directions with respect to the slanted surface of the lens 1050.

That is, as shown in FIG. 17, when the nut 1040 is engaged with the fixing bolt 1020, the combining force F occurring along the axial direction of the fixing bolt 1020 is dispersed into a vertical combining force Fy by which the front surface of the lens 1050 is compressively stuck to the compression surface 1015 of the fixing frame and a horizontal combining force Fx by which one side of the lens 1050 is compressively stuck to the holding pin 1011, respectively, to thereby make the lens 1050 firmly compressively stuck to the fixing frame 1010 in both the vertical and horizontal directions.

As a result, the holding pin 1011 and the side surface of the lens 1050 are engaged with each other without leaving any gap therebetween. Accordingly, the lens 1050 is not bent and simultaneously the fixing bolt 1020 combined with the lens 1050 is not loosened, to thus provide a more stable structure.

Further, the screw 1023 of the fixing bolt 1020 applies a combining force to the slanted surface 1053 of the second through-hole 105 in the form of a face contact. As a result, it is prevented that a combining force F is concentrically applied by a point contact or a line contact in the second through-hole of the lens 1050 made of a synthetic material. Thus, 1 the lens 1050 can be prevented from being bent.

In this case, an angle Q with respect to the vertical direction of the slanted surface 1053 formed in the second through-hole 1051 of the lens 1050 is larger than 0° and smaller than 45°. That is, the angle is selectively applied in proportion with the material and intensity of the lens 1050, at $0° \leq Q \leq 45°$.

If an angle Q of the slanted surface is equal to or smaller than 0 degree, the horizontal combining force Fx is not generated. If an angle Q of the slanted surface exceeds 45 degrees, the horizontal combining force Fx becomes larger than the vertical combining force Fy. As a result, a compressive contact between the lens 1050 and the compression surface 1015 is greatly lowered, to thereby lower the entire combining force.

Here, the angle Q of the slanted surface is limited to be smaller than 45 degrees. However, the lens 1050 will be combined without causing any big trouble unless the angle Q of the slanted surface exceeds 45 degrees greatly.

Also, a slanted washer whose one surface is slanted is adopted in order to prevent a space from being formed between the rear surface of the lens 1050 and the nut 1040.

In this case, the nut 1040 is prevented from being excessively bent by a combing force F of the nut 1040. Also, since the nut 1040 is combined at the state where the nut 1040 is maintained perpendicularly with respect to the axial direction of the fixing bolt 1020, the combining force can be applied to the lens properly.

Meanwhile, a stepped surface 1013D and a head 1021 are formed in parallel with each other as shown in FIG. 15C, by modifying the stepped surface 1013C of the front through-hole portion 1013A shown in FIG. 15A. In this way, it is possible that the fixing bolt 1020 is not pivoted within the first through-hole 1013 and fixed at a predetermined slanted angle.

In this case, when sunglasses having no particular power of lenses and only for screening the sunlight are produced, a slope of the second through-hole of the lens is set at a fixed angle. Accordingly, an assembly speed can be enhanced to thereby enable a mass production and enhance a productivity.

Also, in the case of a method of combining the fixing bolt 1020 at a slanted state by a fixed angle as in the sixth embodiment of the present invention, the head 1021B of the fixing bolt 1020 can be modified so that the head 1021B is not inserted into the first through-hole 1013E.

In this case, a close contact surface 1013F where the head 1021B closely contacts is formed in the fixing frame 1010A, in a slanted shape at a predetermined angle. Simultaneously, the first through-hole 1013 is formed so that the fixing bolt 1020 can be combined in a slanted shape at a fixed angle.

Further, the fixing frame 1010A forms a head close contact surface 1013F which is obliquely formed at a predetermined angle through which the fixing bolt 1020 penetrates.

Here, a second through-hole 1051 slanted at the same angle as that of the first through-hole 1013E is preferably formed in the lens 1050.

Figure 18:
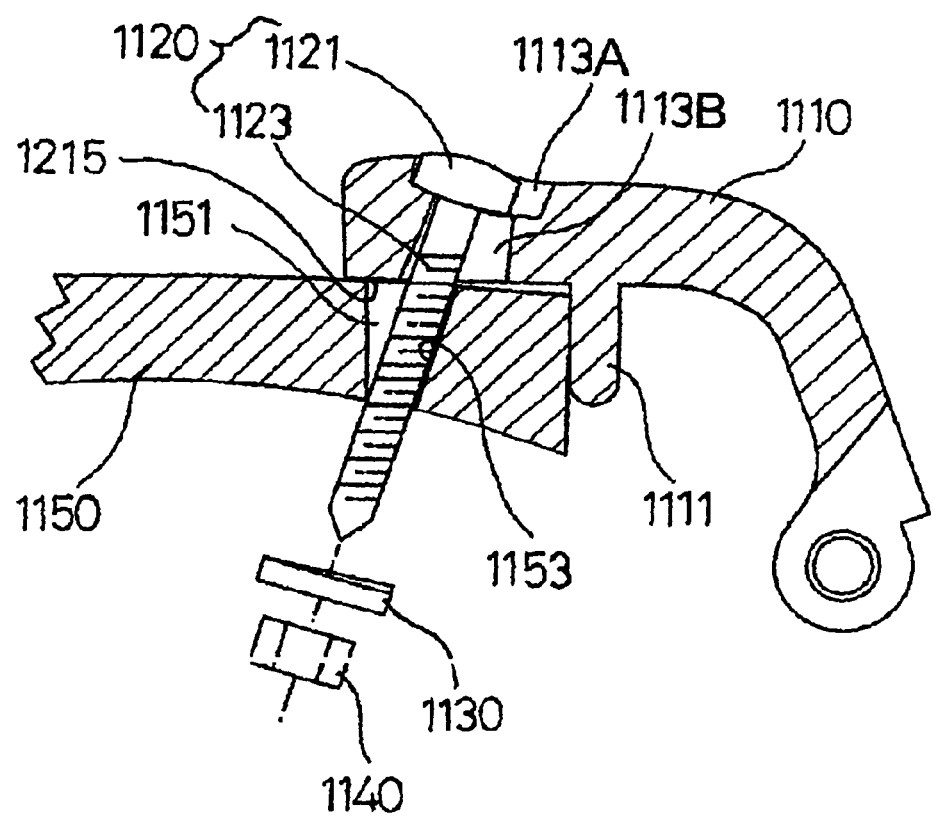
FIG. 18 is a partly cutout sectional view showing a lens fixing apparatus of rimless spectacles according to a seventh embodiment of the present invention.
Figure 19:
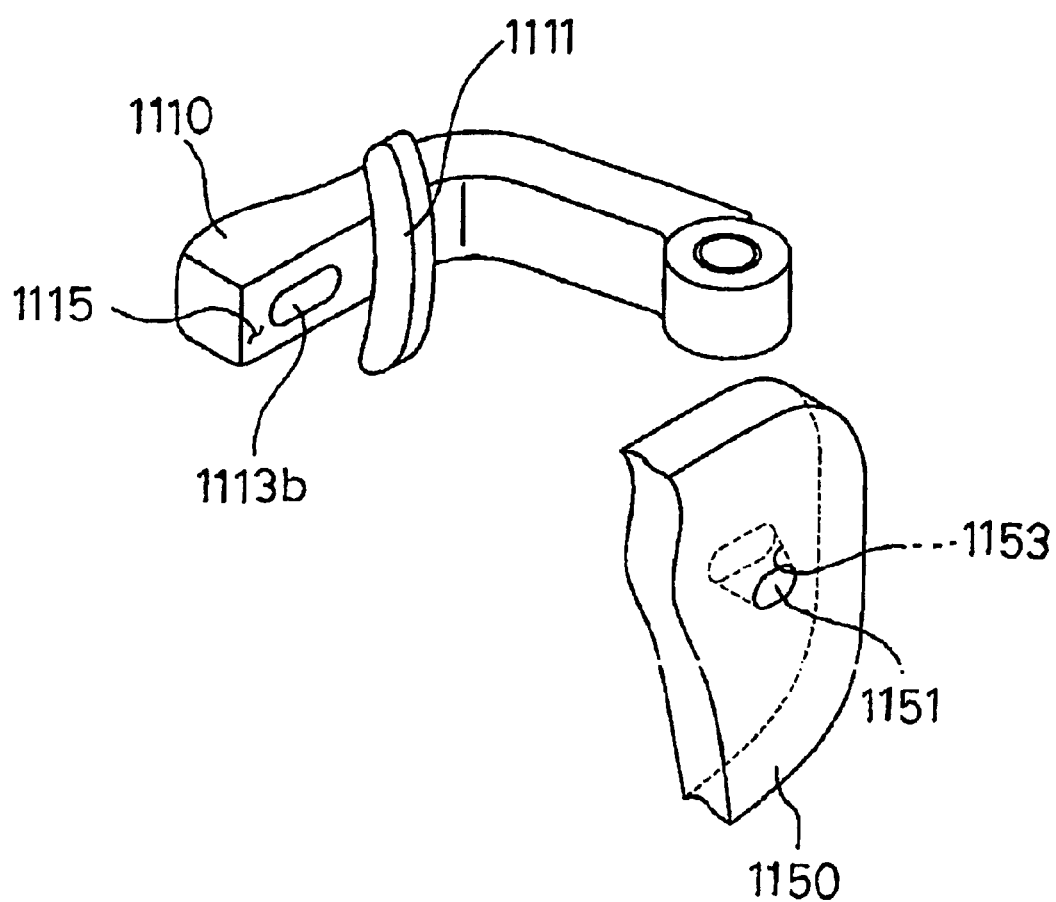
FIG. 19 is a schematic perspective view showing a lens applied in a fixing frame of the lens fixing apparatus of rimless spectacles according to the seventh embodiment of the present invention.

FIG. 18 is a partly cutout sectional view showing a lens fixing apparatus of rimless spectacles according to a seventh embodiment of the present invention. FIG. 19 is a schematic perspective view showing a lens applied in a fixing frame of the lens fixing apparatus of rimless spectacles according to the seventh embodiment of the present invention.

The sixth embodiment of the present invention is applied to a lens having a smaller curvature. A seventh embodiment of the present invention is applied to a lens having a larger curvature than that of the sixth embodiment thereof. That is, the seventh embodiment is applied to a lens having the power of the lens.

As shown in FIGS. 18 and 19, a fixing frame 1110 is formed in the seventh embodiment of the present invention in the same manner as that of the sixth embodiment thereof. The fixing frame 1110 includes a first through-hole 1113 having a front through-hole portion 1113A and a rear through-hole portion 1113B.

Meanwhile, differently from the holding pin made of the pin shape of the sixth embodiment, a holding piece 1111 having a curvature corresponding to one side surface of the lens 1150 in the inner side of the holding piece as shown in FIG. 19.

Also, in the seventh embodiment, the rear surface of one side of the lens 1150 is obliquely formed so that a nut 1140 can be combined perpendicularly with a screw 1123 of a fixing bolt 1120 as shown in FIG. 18. It is preferable to use a slanted washer 1130 selectively according to a slope of the lens rear surface.

In this case, the seventh embodiment can, of course, use a slanted washer 1030 and a lens 1050 having no slope in one side rear surface in the same manner as that of the sixth embodiment.

Meanwhile, as shown in FIG. 18, a second through-hole 1151 having a slanted surface 1153 in one side of the lens 1150 in the same manner as that of the sixth embodiment.

Also, in the seventh embodiment in a way similar to the sixth embodiment, when the slanted washer 1130 and the fixing nut 1140 are engaged with the fixing bolt 1120, a combining force occurring along the axial direction of the fixing bolt 1120 is dispersed into a vertical combining force by which the front surface of a lens 1150 is compressively stuck to the compression surface 1115 of the fixing frame and a horizontal combining force by which one side of the lens 1150 is compressively stuck to the holding pin 1111, respectively, to thereby make the lens 1150 firmly compressively stuck to the fixing frame 1110 in both the vertical and horizontal directions.

Figure 20A:
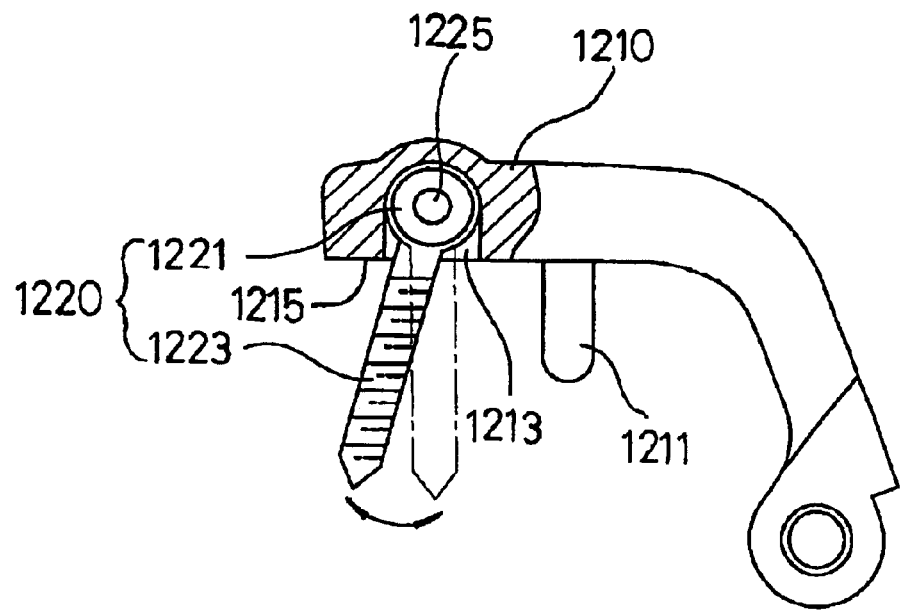
FIGS. 20A through 20C are partly cutout sectional views showing the states where a fixing bolt is pivotally combined with a fixing frame in a lens fixing apparatus of rimless spectacles according to an eighth embodiment of the present invention, respectively.
Figure 20B:
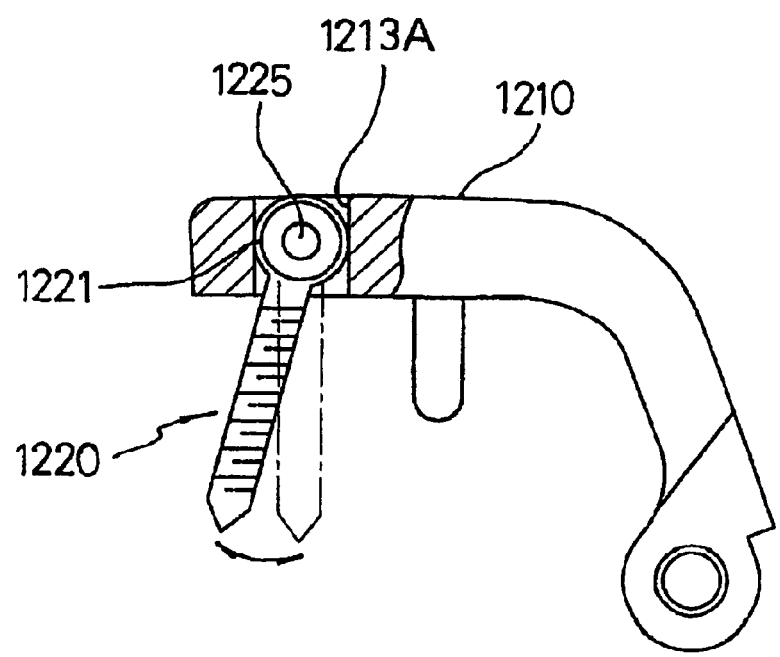
Figure 20C:
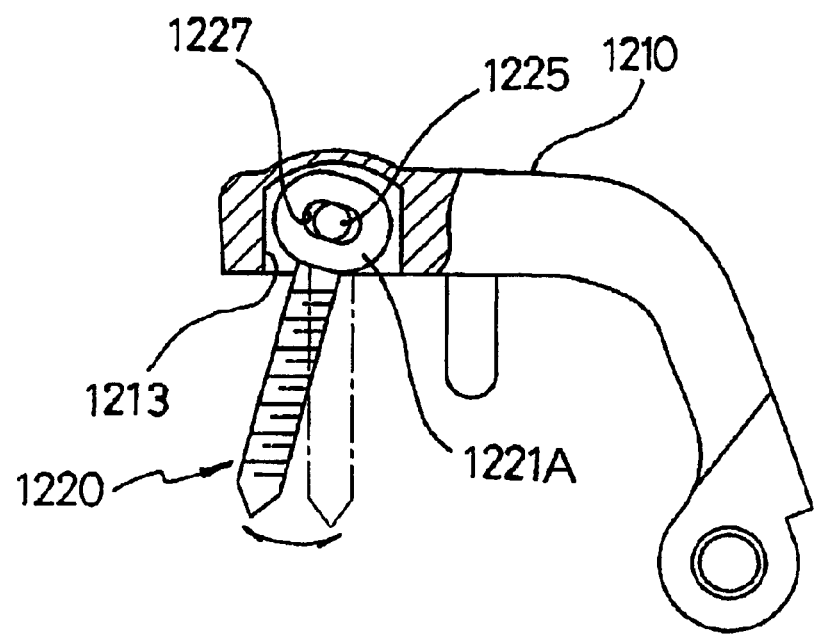

FIGS. 20A through 20C are partly cutout sectional views showing the states where a fixing bolt is pivotally combined with a fixing frame in a lens fixing apparatus of rimless spectacles according to an eighth embodiment of the present invention, respectively.

In the eighth embodiment of the present invention, an insertion groove 1213 is formed in the rear surface of a fixing frame 1210. A head 1221 of a fixing bolt 1220 formed in a circular shape is supported by a hinge pin 1225 in the insertion groove 1213 so as to be pivoted by a predetermined angle.

In the eighth embodiment, the lens and the fixing nut have the same structures as those of the sixth embodiment.

In this case, a screw 1223 of the fixing bolt 1220 contacts face to face the slanted surface 1053 of the second through-hole 1051 formed in the lens 1050. Accordingly, a phenomenon that a stress is concentrated on a particular portion in the inner side of the second through-hole 1053 of the lens 1050, can be prevented. As a result, the lens can be prevented from being cracked or broken.

Also, the fixing bolt 1220 is maintained to be connected with the fixing frame 1210. Thus, in the case that the lens is fixed to the fixing frame 1210, an assembly is easily done. As well, the insertion groove 1213 is formed on the compression surface 1215 in the rear surface of the fixing frame 1210, so that the fixing bolt 1220 is not seen from the front of the fixing frame 1210. As a result, an external appearance can be neatly maintained.

Meanwhile, in the case of a hinged fixing structure of the eighth embodiment, it is also possible that a first through-hole 1213A of FIG. 20B is formed instead of working the insertion groove 1213 of FIG. 20A, and then the head 1221 of the fixing bolt 1220 is hinge-combined in the first through-hole 1213A by the hinge pin 1225.

Also, in the case that the position of the second through-hole on the lens is somewhat beyond a right position, a long hole 1227 is formed in a head 1227 as shown in FIG. 20C, so that the fixing bolt 1220 can be moved by a predetermined interval in the left and right directions at the time of combining the fixing bolt 1220 with the lens. In this manner, it is also possible to correct the position of the second through-hole established in the lens.

Figure 21A:
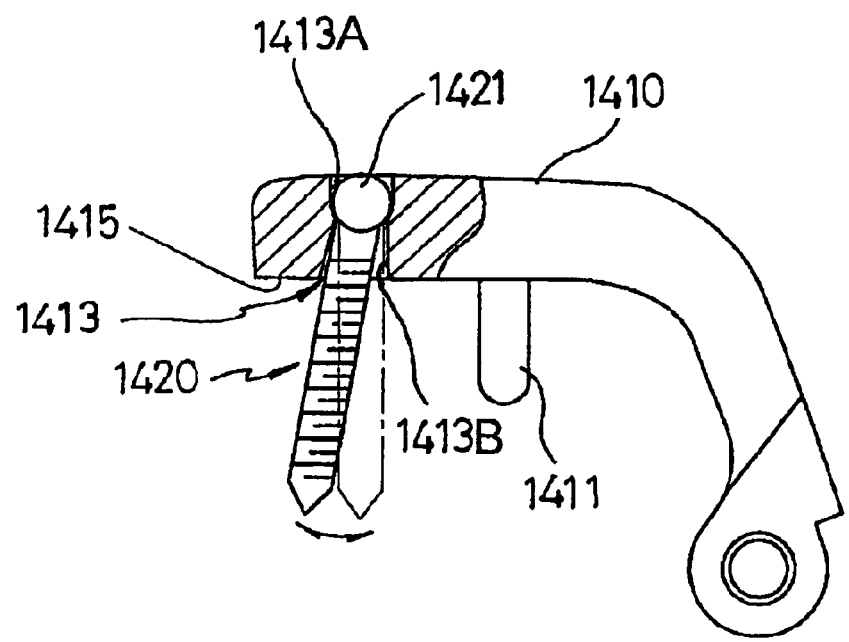
FIG. 21A is a partly cutout sectional view showing the state where a fixing bolt is pivotally combined with a fixing frame in a lens fixing apparatus of rimless spectacles according to a ninth embodiment of the present invention.

FIG. 21A is a partly cutout sectional view showing the state where a fixing bolt is pivotally combined with a fixing frame in a lens fixing apparatus of rimless spectacles according to a ninth embodiment of the present invention. FIG.

21B is a perspective view showing a T-shaped fixing bolt in the lens fixing apparatus of rimless spectacles according to the ninth embodiment of the present invention.

Figure 21B:
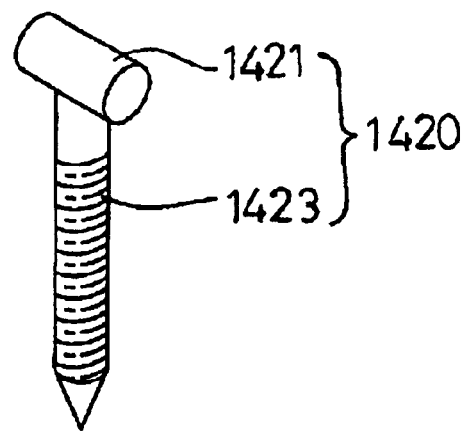
FIG. 21B is a perspective view showing a T-shaped fixing bolt in the lens fixing apparatus of rimless spectacles according to the ninth embodiment of the present invention.

In the ninth embodiment of the present invention similarly to the eighth embodiment, a fixing bolt 1240 is hinge-combined with a fixing frame 1410. Here, the fixing bolt 1420 is formed of a T-shaped member as shown in FIG. 21B.

The fixing bolt 1420 includes a head 1421 perpendicularly extended from a screw portion 1423. As shown in FIG. 21A, a front through-hole portion 1413A of a through-hole 1413 is formed in correspondence to the head 1421, so as to make the head 1421 pivoted in a face-to-face contact state.

Figure 22:
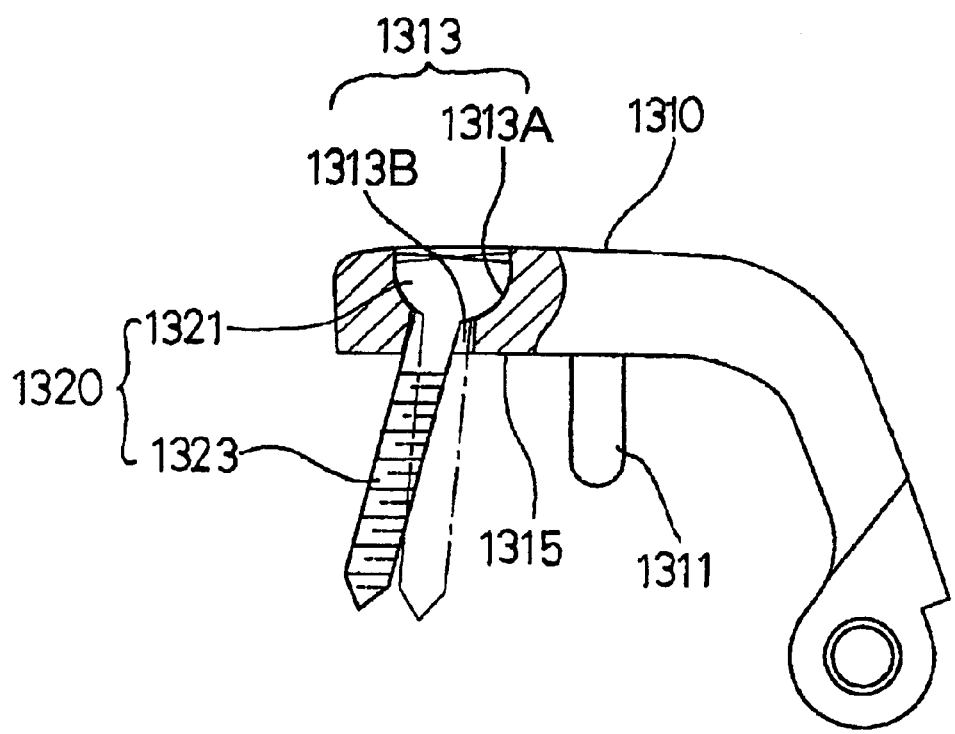
FIG. 22 is a partly cutout sectional view showing the state where a fixing bolt is pivotally combined with a fixing frame in a lens fixing apparatus of rimless spectacles according to a tenth embodiment of the present invention.

FIG. 22 is a partly cutout sectional view showing the state where a fixing bolt is pivotally combined with a fixing frame in a lens fixing apparatus of rimless spectacles according to a tenth embodiment of the present invention.

In the tenth embodiment of the present invention similarly to the eighth embodiment, a fixing bolt is pivotally combined with a fixing frame. However, as shown in FIG. 22, a front through-hole portion 1313A of a first through-hole 1313 formed in a fixing frame 1310 is formed in a hemisphere shape, and a head 1321 of a fixing bolt 1320 is formed in a hemisphere shape so as to be pivoted by a predetermined angle in a face-to-face contact state to the front through-hole portion 1313A.

If a slanted washer 1030 and a fixing nut 1040 are engaged with a fixing bolt 1220, 1320 or 1420 in the eighth through tenth embodiments in a way similar to that of the sixth embodiment, a combining force occurring along the axial direction of the fixing bolt 1220, 1320, or 1420 is dispersed into a vertical combining force by which the front surface of a lens 1050 is compressively stuck to the compression surface 1215, 1315, or 1415 of the fixing frame and a horizontal combining force by which one side of the lens 1050 is compressively stuck to the holding pin 1211, 1311, or 1411 respectively, to thereby make the lens 1050 firmly compressively stuck to the fixing frame 1210, 1310, or 1410 in both the vertical and horizontal directions.

Meanwhile, a pin-shaped holding pin 1211, 1311, or 1411 is formed in the rear surface of the fixing frame 1210 or 1310 in the eighth through tenth embodiments, as shown in FIGS. 20A through 22. However, it is also possible to be formed as a holding piece shape as in the seventh embodiment.

Figure 23A:
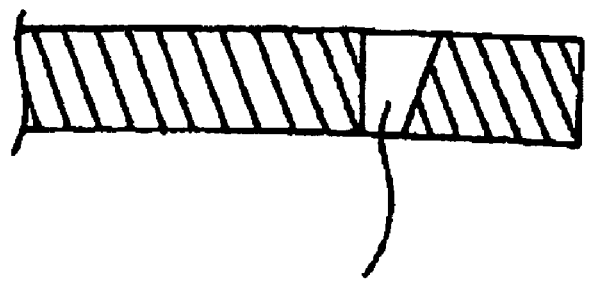
FIGS. 23A and 23B are sectional views showing a second through-hole of a lens selectively applied to the sixth through tenth embodiments of the present invention.
Figure 23B:
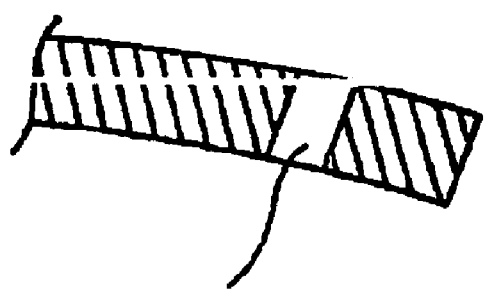

Also, in the case of the second through-hole formed in the lens applied to the sixth through tenth embodiments, respectively, it is preferable that the shape of the through-hole is selectively formed as one of a conical second through-hole 1051A of FIG. 23A or a slanted second through-hole 1051B, according to a curvature or combining method of the lens.

Industrial Applicability

As described above, a lens fixing apparatus for the rimless spectacles widely accommodate a range of an allowable error with respect to a perforation position of each through-hole when an expert in glasses perforates the through-hole of each lens manually in order to connect the lens to fixing frames without leaving any gap between the side ends and a holder of the lens, and thus the lens is compressively fixed to the fixing frames and the inner sides of the holder respectively by forming a slanted surface in the rear surface of the fixing frame to thereby eradicate a twisting phenomenon of the lens, and simultaneously a fixing bolt and a fixing nut connected to both the lens and each of the fixing frames are prevented from being loosened, with a result that a reliability of the spectacles can be secured and working hours for manufacturing the spectacles are shortened to thereby enhance a productivity.

Also, a fixing bolt is penetrated into and combined with a fixing frame and a lens, in a slanted state slanted with respect to the lens, and thus a combining force having occurred by connection of a nut to the fixing bolt is dispersed into a horizontal combining force with respect to the front surface of the lens and a vertical combining force respectively, and a stress concentration is mitigated on a particular portion of the inner side of a through-hole of the lens, to thereby prevent the lens from being broken.

Further, a fixing frame is combined with a sawtooth-shaped or wedge-shaped washer and simultaneously a twisting preventive unit is disposed between the side surface of the lens and the holder, with a result that one side of the lens is stuck to the holder side without any gap between the lens and the holder, and thus the lens is prevented from being pushed backwards or twisted, due to a vibration or shock applied to the rimless spectacles during wearing.

As described above, the present invention has been described with respect to particularly preferred embodiments. However, the present invention is not limited to the above embodiments, and it is possible for one who has an ordinary skill in the art to make various modifications and variations, without departing off the spirit of the present invention.

What is claimed is:

1. A lens fixing apparatus of rimless spectacles in which each lens is fixed to each temple of the spectacles or a bridge, without having any rims, the lens fixing apparatus comprising:

a fixing frame having a compression surface compressively contacting the rear surface of the lens, formed on the front surface of the fixing frame, in which a holder on one side of the front surface of which the side surface of the lens compressively contacts is formed perpendicularly to the compression surface, a first sawtooth-shaped uneven portion is formed on the rear surface of the fixing frame, made of a plurality of protrusions each whose one surface is vertical and other surface is slanted and a long hole is formed on the center of the fixing frame;

a sawtooth-shaped washer having a second sawtooth-shaped uneven portion made of a plurality of protrusions whose one surface is vertical and other surface is slanted, so as to be engaged with the first sawtooth-shaped uneven portion;

a fixing bolt penetrating the lens, the long hole of the fixing frame and the sawtooth-shaped washer, respectively; and a nut combined with the fixing bolt.

2. A lens fixing apparatus of rimless spectacles in which each lens is fixed to each temple of the spectacles or a bridge, without having any rims, the lens fixing apparatus comprising:

a fixing frame having a compression surface extensively formed in one side of the temple of the spectacles or the bridge, in which a portion of the front surface of the lens compressively contacts the rear surface of the fixing frame, a first through-hole is formed to obliquely penetrate the rear and front surfaces of the fixing frame, and a holder for fixedly supporting one side of the lens is extensively formed perpendicularly to the compression surface;

a second through-hole formed in a slanted way in one side of the lens;

a fixing bolt including a head supported to the first through-hole, and a screw portion extended from the lower end of the head and obliquely inserted into the first and second through-holes; and a nut threadedly combined with the other end of the fixing bolt, wherein in the case that the nut is combined on the screw portion, a combining force applied along the axial direction of the fixing bolt obliquely combined to the fixing frame and the lens is dispersed into a vertical combining force directed from the front surface of the lens to the compression surface and a horizontal combining force directed to from the one side of the lens to the holder, respectively.

3. The lens fixing apparatus of rimless spectacles of claim 2, further comprising a slanted washer disposed between the nut and the rear surface of the lens, whose one surface is slanted in correspondence to a curvature of the lens.

4. The lens fixing apparatus of rimless spectacles of claim 2, wherein the first through-hole of the fixing frame comprises a stepped surface in the inside of the first through-hole, and the fixing bolt includes the head pivotally securely disposed in the stepped surface of the first through-hole, and the screw portion extensively formed from the head and penetrates the first through-hole of the fixing frame and the second through-hole of the lens.

5. The lens fixing apparatus of rimless spectacles of claim 4, wherein the head forms a bend in its lower end, and the stepped surface of the first through-hole forms a bend in correspondence to the lower end of the head.

6. The lens fixing apparatus of rimless spectacles of claim 4, wherein the head has a flat lower end in order to fixedly maintain a combining angle of the fixing bolt combined to the fixing frame, and the stepped surface of the first through-hole is formed flatly and obliquely in correspondence to the head.

7. The lens fixing apparatus of rimless spectacles of claim 2, wherein the fixing frame further comprises a close adhesion surface having a slope in correspondence to that of the fixing bolt on the front side of the fixing frame so that the lower end of the head of the fixing bolt obliquely combined to the fixing frame closely contacts the fixing frame.

8. A lens fixing apparatus of rimless spectacles in which each lens is fixed to each temple of the spectacles or a bridge, without having any rims, the lens fixing apparatus comprising:

a fixing frame having a compression surface extensively formed in one side of the temple of the spectacles or the bridge, in which a portion of the front surface of the lens compressively contacts the rear surface of the fixing frame, a first through-hole is formed on the compression surface and a holder is extensively formed perpendicularly to the compression surface;

a fixing bolt formed of a circular head pivotally supported to the first through-hole of the fixing frame and a screw portion extended from the head and obliquely and penetratively combining the fixing frame and lens horizontally with each other;

a nut threadedly combined with the other end of the fixing bolt;

a slanted washer whose one surface is slanted, which is disposed between the nut and the rear surface of the lens; and a second through-hole obliquely formed in one side of the lens, through which the screw portion is penetrated, wherein in the case that the nut is combined on the screw portion, a combining force applied along the axial direction of the fixing bolt obliquely combined to the fixing frame and the lens is dispersed into a vertical combining force directed from the front surface of the lens to the compression surface and a horizontal combining force directed to from the one side of the lens to the holder, respectively.

9. A lens fixing apparatus of rimless spectacles in which each lens is fixed to each temple of the spectacles or a bridge, without having any rims, the lens fixing apparatus comprising:

a fixing frame having a compression surface extensively formed in one side of the temple of the spectacles or the bridge, in which a portion of the front surface of the lens compressively contacts the rear surface of the fixing frame, a first through-hole is formed to penetrate the rear and front surfaces of the fixing frame and a holder is extensively formed perpendicularly to the compression surface;

a fixing bolt formed of a circular head pivotally and hingedly combined to the first through-hole of the fixing frame and a screw portion extended from the head and obliquely and penetratively combining the fixing frame and lens horizontally with each other;

a nut threadedly combined with the other end of the fixing bolt;

a slanted washer whose one surface is slanted, which is disposed between the nut and the rear surface of the lens; and a second through-hole obliquely formed in one side of the lens, through which the screw portion is penetrated, wherein in the case that the nut is combined on the screw portion, a combining force applied along the axial direction of the fixing bolt obliquely combined to the fixing frame and the lens is dispersed into a vertical combining force directed from the front surface of the lens to the compression surface and a horizontal combining force directed to from the one side of the lens to the holder, respectively.

* * * * *